(12) United States Patent
Samih et al.

(10) Patent No.: US 11,593,154 B2
(45) Date of Patent: Feb. 28, 2023

(54) OPERATING SYSTEM ASSISTED PRIORITIZED THREAD EXECUTION

(71) Applicant: Intel Corporation, Santa Clara, CA (US)

(72) Inventors: Ahmad Samih, Austin, TX (US); Rajshree Chabukswar, Sunnyvale, CA (US); Russell Fenger, Beaverton, OR (US); Shadi Khasawneh, Austin, TX (US); Vijay Dhanraj, Beaverton, OR (US); Muhammad Abozaed, Portland, OR (US); Mukund Ramakrishna, Austin, TX (US); Atsuo Kuwahara, Portland, OR (US); Guruprasad Settuvalli, Hillsboro, OR (US); Eugene Gorbatov, Hillsboro, OR (US); Monica Gupta, Santa Clara, CA (US); Christine M. Lin, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 16/228,136

(22) Filed: Dec. 20, 2018

(65) Prior Publication Data

US 2020/0201671 A1 Jun. 25, 2020

(51) Int. Cl.
| | |
|---|---|
| *G06F 9/46* | (2006.01) |
| *G06F 9/48* | (2006.01) |
| *G06F 9/50* | (2006.01) |
| *G06F 9/30* | (2018.01) |

(52) U.S. Cl.
CPC ........ *G06F 9/4831* (2013.01); *G06F 9/30101* (2013.01); *G06F 9/5011* (2013.01)

(58) Field of Classification Search
CPC ............... G06F 9/4831; G06F 9/30101; G06F 9/5011
See application file for complete search history.

(56) References Cited

U.S. PATENT DOCUMENTS

| | | | |
|---|---|---|---|
| 2006/0066623 A1* | 3/2006 | Bowen | G06F 9/3851 345/506 |
| 2007/0294694 A1* | 12/2007 | Jeter | G06F 9/3851 718/102 |
| 2009/0138683 A1* | 5/2009 | Capps, Jr. | G06F 9/30101 712/220 |

(Continued)

*Primary Examiner* — Tammy E Lee
(74) *Attorney, Agent, or Firm* — Trop, Pruner & Hu, P.C.

(57) ABSTRACT

The present disclosure is directed to dynamically prioritizing, selecting or ordering a plurality threads for execution by processor circuitry based on a quality of service and/or class of service value/indicia assigned to the thread by an operating system executed by the processor circuitry. As threads are executed by processor circuitry, the operating system dynamically updates/associates respective class of service data with each of the plurality of threads. The current quality of service/class of service data assigned to the thread by the operating system is stored in a manufacturer specific register (MSR) associated with the respective thread. Selection circuitry polls the MSRs on a periodic, aperiodic, intermittent, continuous, or event-driven basis and determines an execution sequence based on the current class of service value associated with each of the plurality of threads.

24 Claims, 17 Drawing Sheets

(56) References Cited

U.S. PATENT DOCUMENTS

| | | | |
|---|---|---|---|
| 2010/0131957 A1* | 5/2010 | Kami | G06F 9/5077 |
| | | | 718/104 |
| 2011/0055469 A1* | 3/2011 | Natu | G06F 9/30101 |
| | | | 711/105 |
| 2011/0099402 A1* | 4/2011 | Zhang | G06F 9/5094 |
| | | | 713/323 |
| 2016/0147275 A1* | 5/2016 | Weissmann | G06F 1/3296 |
| | | | 713/322 |
| 2017/0228260 A1* | 8/2017 | Krishan | G06F 9/4881 |

* cited by examiner

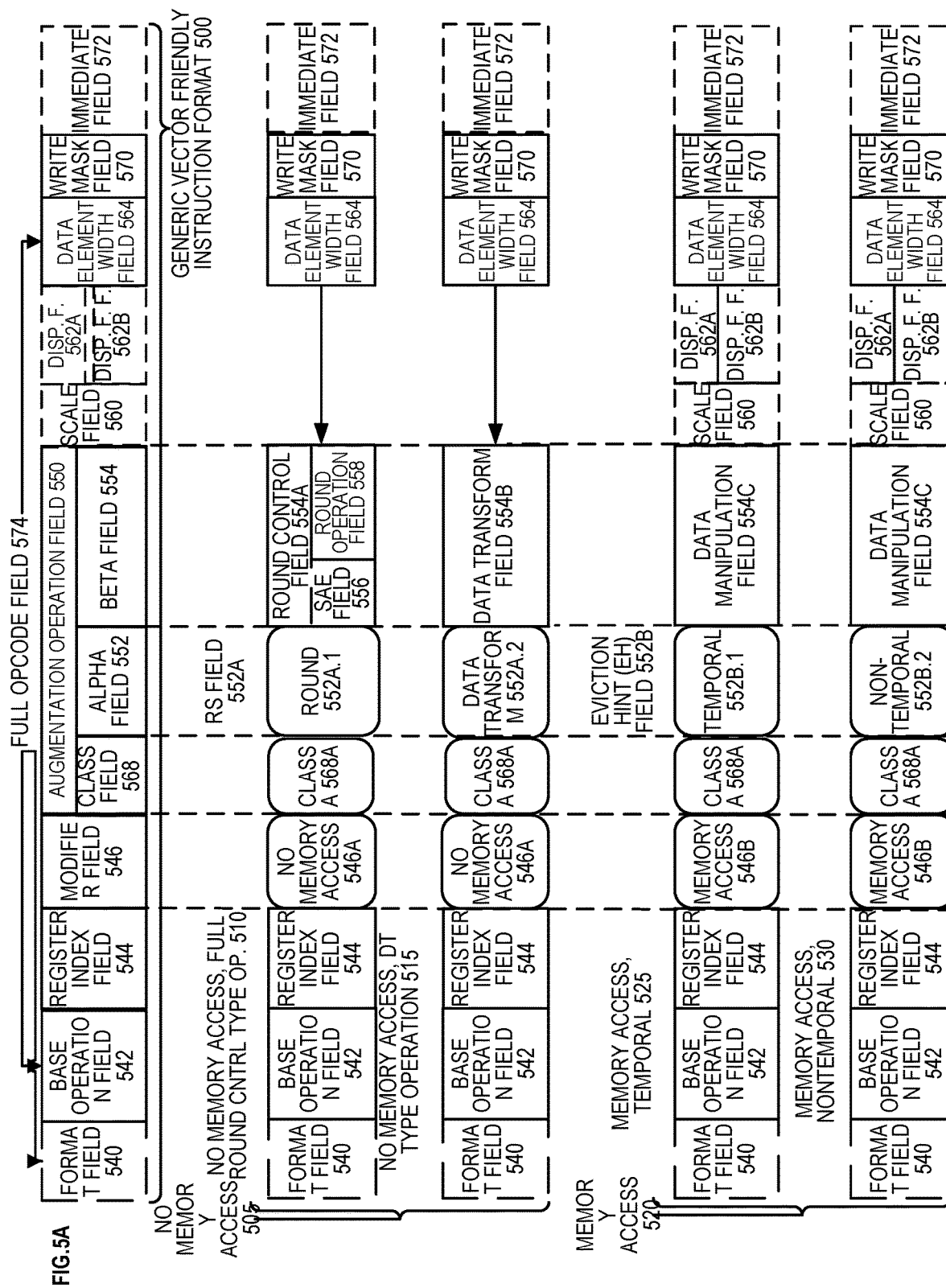

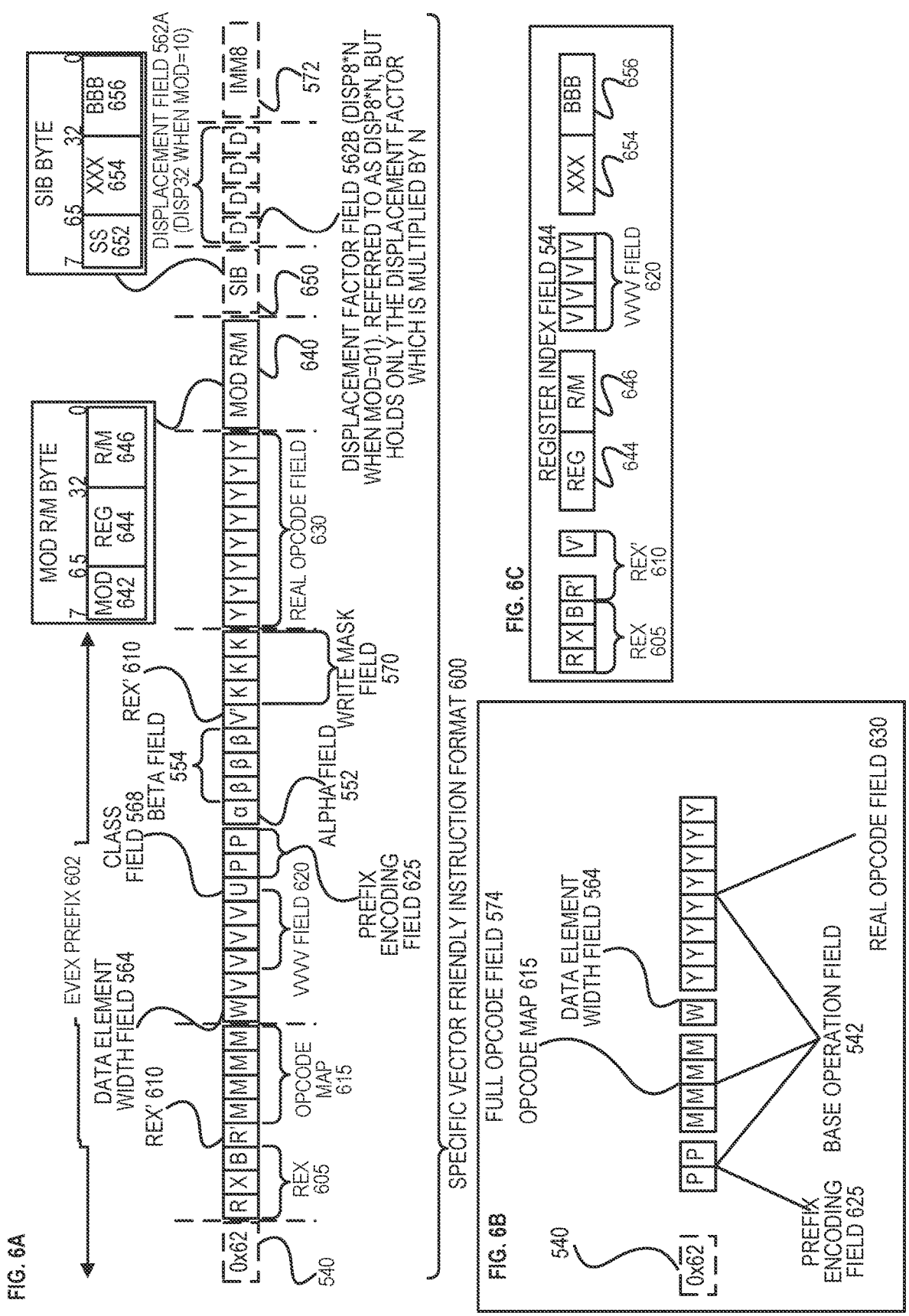

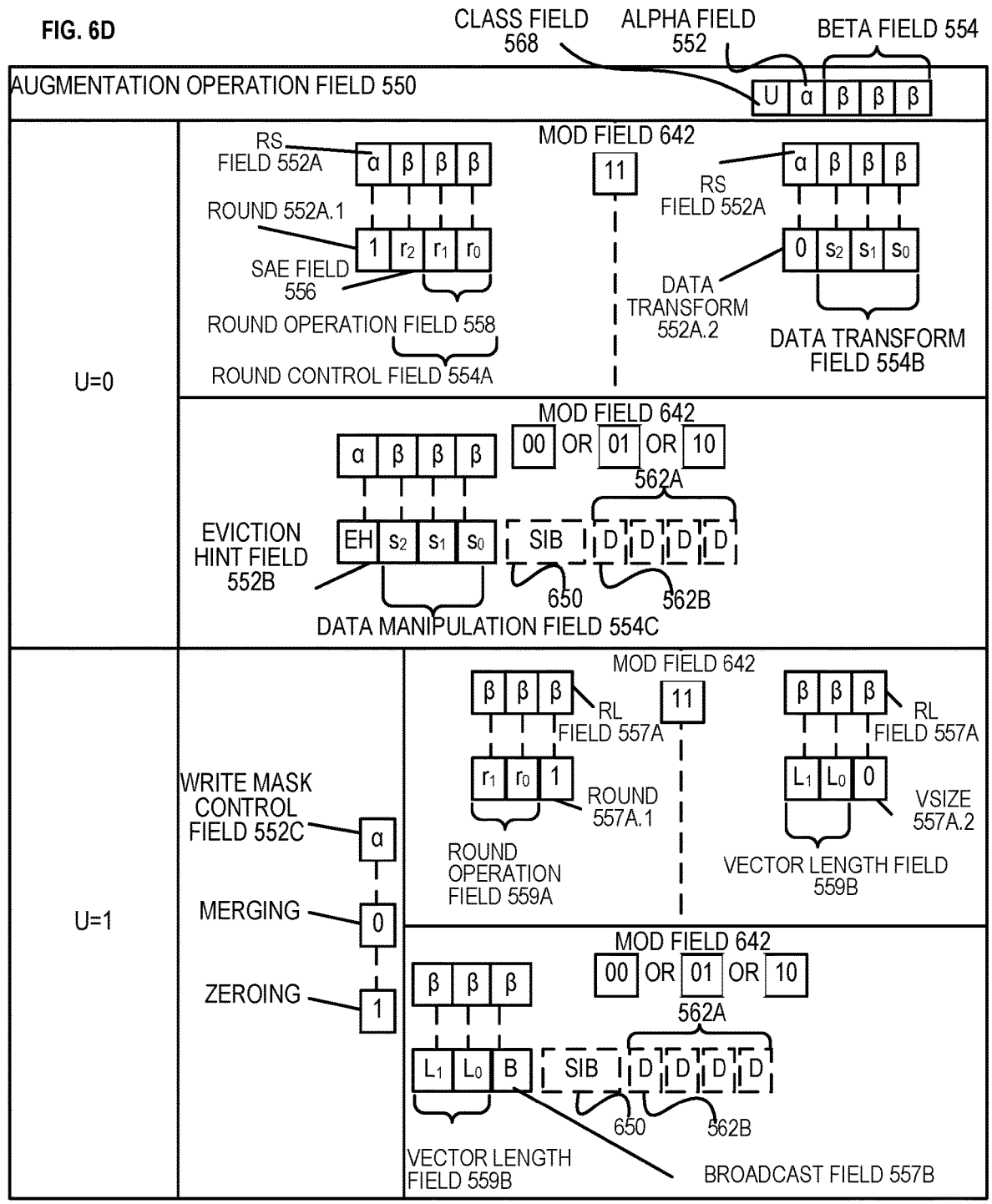

FIG. 7
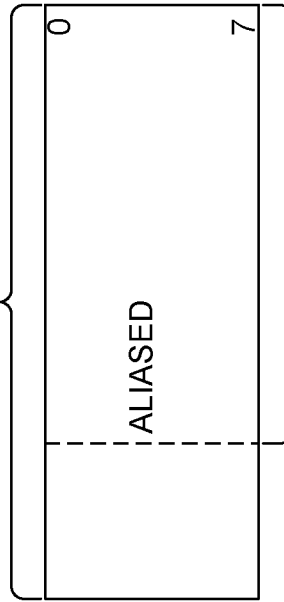
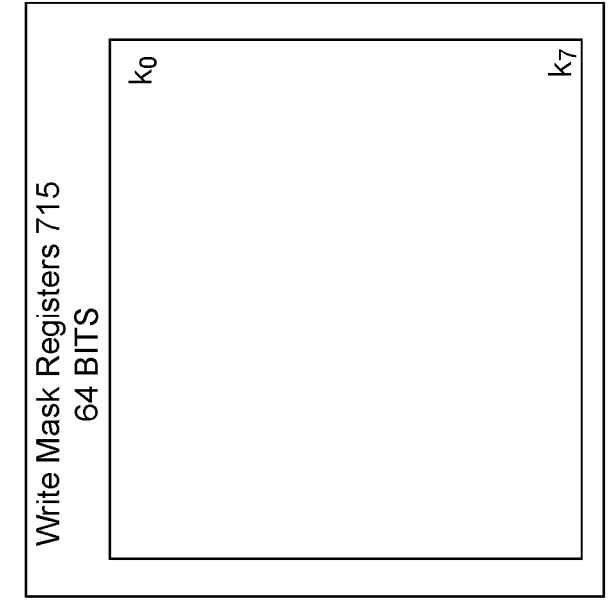
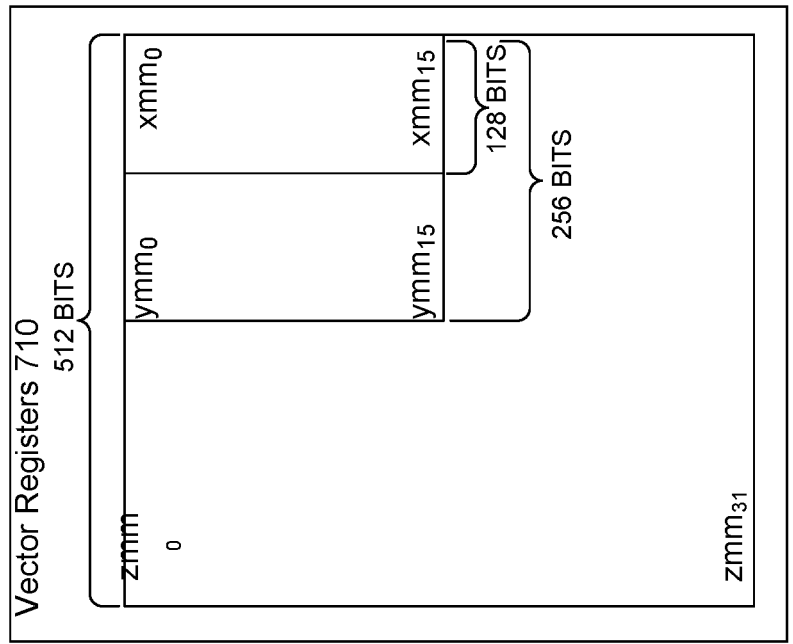

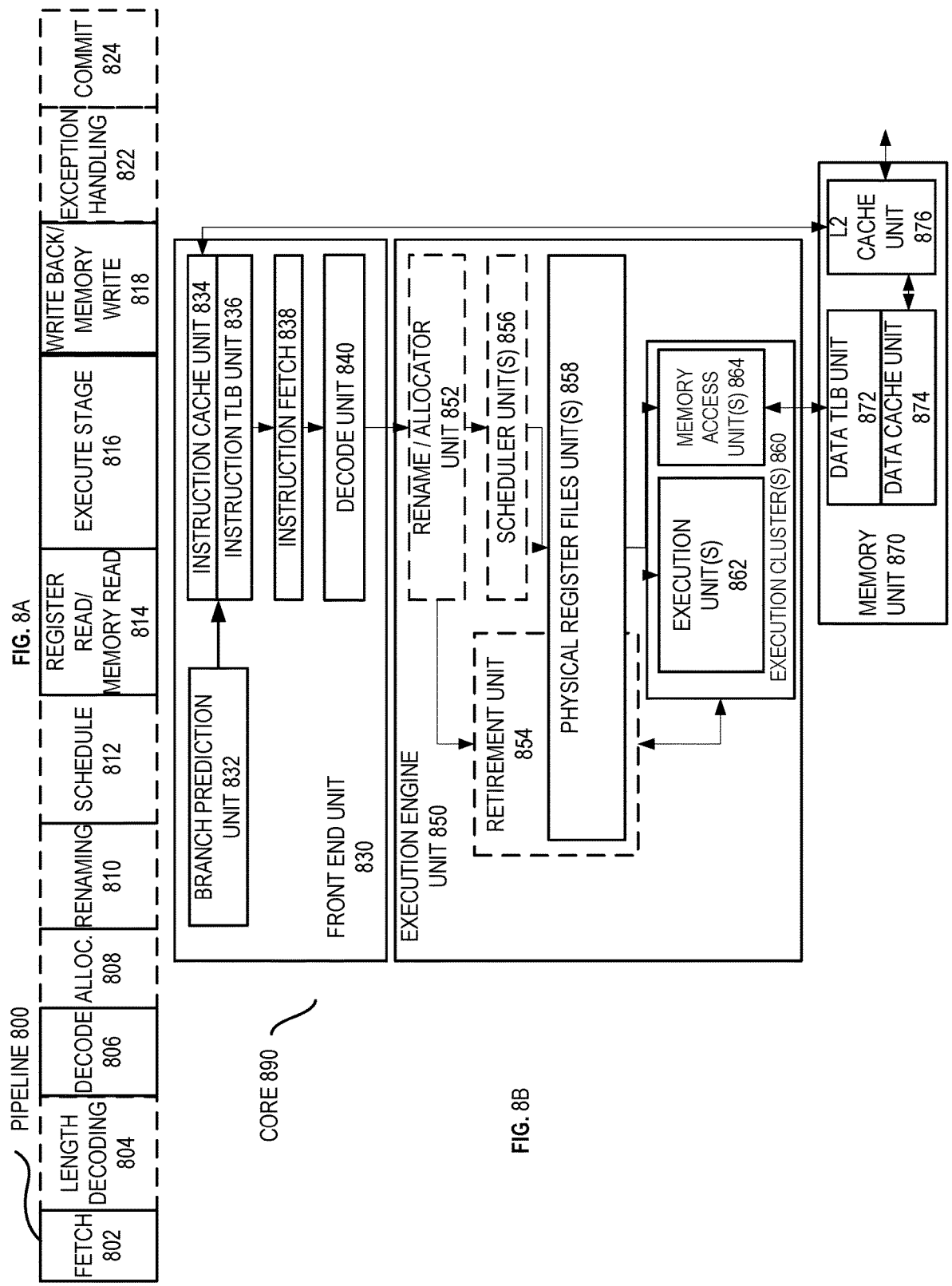

OPERATING SYSTEM ASSISTED PRIORITIZED THREAD EXECUTION

TECHNICAL FIELD

The present disclosure relates to thread execution prioritization.

BACKGROUND

A set of critical resources, such as processor cache memory and main system memory, exist within a computing system. When multiple applications are executed on the system, for example applications executed by threads on a multi-core processor, contention for such critical resources may occur. Techniques for management of critical system resources vary greatly. For example, in simplest form, implementation of critical system resource management may be left to individual system components based on their individual needs and usage model. Such an ad-hoc division of critical system resources frequently results in compromised, and often unsatisfactory, system performance and/or behavior.

Several Quality of Service (QoS) techniques have been proposed and used in software and/or hardware space when multiple applications are executed and/or virtual machines are implemented simultaneously. Often, hardware-only QoS techniques are unsatisfactory because hardware is unable to determine an optimal thread execution sequence without knowing the priority of the thread being executed (e.g., the priority of the thread with respect to other threads being executed by the system). Software solutions, such as those implemented at the operating system level, are unable to efficiently handle resource contention while achieving optimal hardware performance and energy efficiency across a variety of platforms, each having different system hardware and hardware configuration.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 5A and FIG. 5B are block diagrams illustrating a generic vector friendly instruction format and instruction templates thereof according to embodiments of the invention;

FIG. 6A, FIG. 6B, FIG. 6C, and FIG. 6D are block diagrams illustrating an exemplary specific vector friendly instruction format according to embodiments of the invention;

FIG. 7 is a block diagram of a register architecture according to one embodiment of the invention;

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention;

Figure 1:
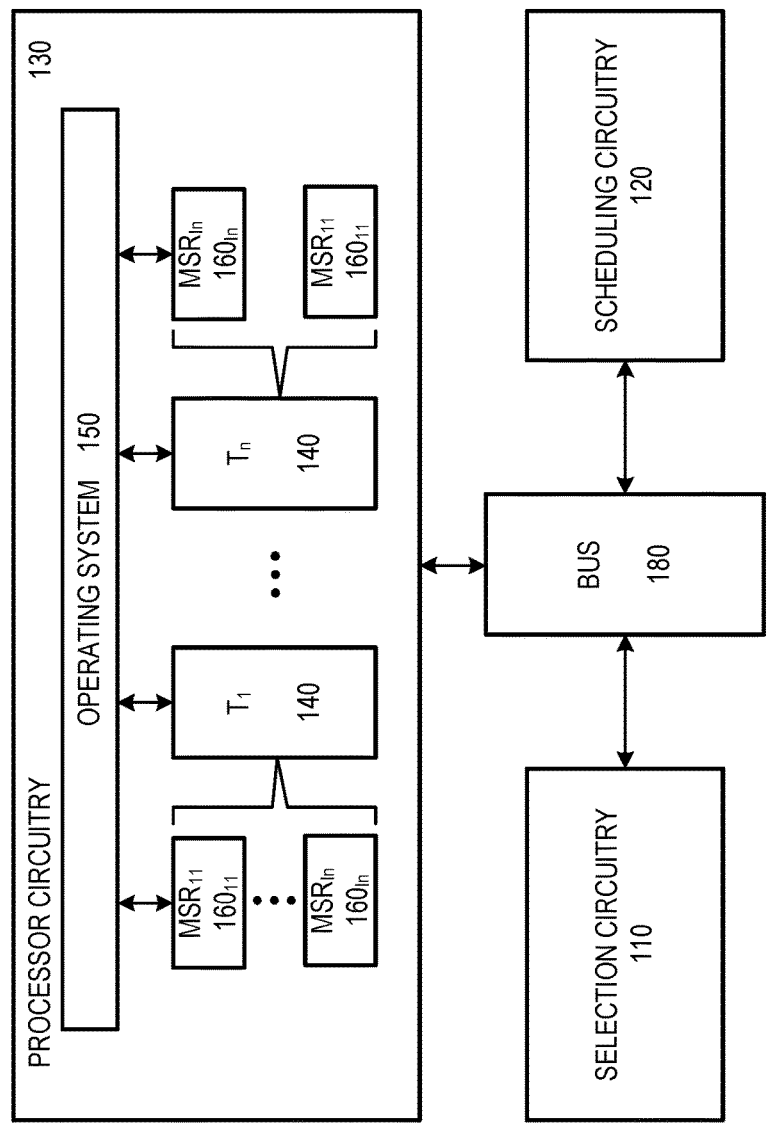
FIG. 1 is a block diagram of an illustrative system that includes selection circuitry that causes scheduling circuitry to dynamically schedule the execution sequence of a plurality of threads based at least in part on class of service data assigned by an operating system and stored in one or more model specific registers associated with respective ones of the plurality of threads, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Attempts have been made to bridge the QoS between hardware and software by permitting the operating system to explicitly request and/or prioritize system resources (e.g., processor clock cycles, etc.) for each thread. Such solutions suffer in two key areas that compromise the ability of such systems to provide an effective solution. First, static assignment of execution prioritization lacks the capability to dynamically react to changing QoS requirements and provide an "automated" hardware QoS relative to the thread priority/runtime dynamics (e.g., which threads are in an ON/OFF state). Such solutions thus lead to suboptimal performance and/or poor energy efficiency. Second, such solutions add a significant burden to the operating system in order to provide adequate scalability and to efficiently use all of the low-level microarchitectural details for each new system-on-chip (SoC). To enforce QoS-based thread execution prioritization at different hardware levels (cache, memory, ring), the operating system requires invasive changes to be able to simultaneously schedule thread execution at multiple levels without one level thrashing another. Further, any introduction of new hardware QoS features requires further changes to the operating system to support the features in harmony with other existing features, resulting in scalability issues.

More recently, operating systems have begun to dynamically tag threads with expected class of service (e.g., low priority, medium priority, high priority, multi-media). Such operating systems have the ability to dynamically change or reassign the class of service associated with each of a plurality of threads executed by a processor. The systems and methods described herein provide the capability for a dynamic assignment of system resources, such as processor clock cycles, based on the expected class of service associated with each of a plurality of threads. Advantageously, the systems and methods described herein dynamically schedule the execution of each of a plurality of threads in response to changes made by the operating system to the expected class of service associated with respective ones of the plurality of threads.

In the systems and methods described herein, an operating system stores data indicative of a desired class of service for each thread in one or more model specific registers (MSRs) associated with the respective thread. Selection circuitry polls the MSRs to obtain the data indicative of the respective class of service associated with respective ones of the plurality of threads. The selection circuitry may poll the MSRs on a periodic, aperiodic, intermittent, continuous, or event-driven basis. Using the received data representative of the class of service for each respective one of the plurality of threads, the selection circuitry causes the processor circuitry to execute the threads in an order determined, at least in part, based on the current class of service data stored in the MSR associated with the threads. In the systems and methods described herein, the selection circuitry may cause scheduling circuitry to order or otherwise control the execution of threads by the processor. Advantageously, as the operating system updates the class of service assigned to each thread, the selection circuitry may promote or demote the execution of the thread based on the current, rather than original or historical class of service, associated with each thread.

A dynamic thread execution selection and prioritization system is provided. The system may include: processor circuitry to execute an operating system, the processor circuitry including a plurality of processor core circuits, each of the processor core circuits to execute a respective one of a plurality of threads; memory circuitry including a plurality of model specific registers (MSR), each of the plurality of MSRs associated with a respective one of the plurality of threads; and each of the plurality of MSRs to receive MSR data from the operating system; and selection circuitry coupled to the memory circuitry, the selection circuitry to: poll each of the plurality of MSRs to obtain the MSR data stored in the respective MSR; and dynamically select one or more requests by each of at least some of the plurality of threads for execution based at least in part on the MSR data associated with the respective thread and the MSR data associated with each respective one of at least a portion of the remaining plurality of threads.

A thread execution selection and prioritization method is provided. The method may include: polling, by selection circuitry, each of a plurality of model specific registers (MSRs) to obtain MSR data, each of the plurality of MSRs associated with a respective one of a plurality of threads executed by processor circuitry; and dynamically selecting, by the selection circuitry, one or more requests by each of at least some of the plurality of threads for execution based at least in part on the MSR data associated with the respective thread and the MSR data associated with each respective one of at least a portion of the remaining plurality of threads.

A non-transitory, machine-readable, storage device is provided. The non-transitory storage device includes instructions that, when executed, cause selection circuitry to: poll each of a plurality of model specific registers (MSRs) to obtain MSR data, each of the plurality of MSRs associated with respective ones of a plurality of threads executed by processor circuitry; and dynamically select one or more requests by each of at least some of the plurality of threads for execution by the processor circuitry based at least in part on the MSR data associated with the respective thread and the MSR data associated with each respective one of at least a portion of the remaining plurality of threads.

A thread execution selection and prioritization system is provided. The system may include: means for polling each of a plurality of model specific registers (MSRs) to obtain MSR data, each of the plurality of MSRs associated with a respective one of a plurality of threads executed by processor circuitry; and means for dynamically selecting one or more requests by each of at least some of the plurality of threads for execution based at least in part on the MSR data associated with the respective thread and the MSR data associated with each respective one of at least a portion of the remaining plurality of threads.

As used herein the terms "about" or "approximately" when used to prefix an enumerated value should be interpreted to indicate a value that is plus or minus 15% of the enumerated value. Thus, a value that is listed as "about 100" or "approximately 100%" should be understood to represent a value that could include any value or group of values between 85 (i.e., −15%) to 115 (i.e., +15%).

As used herein the term "processor circuit" may refer to the physical circuitry included in a microprocessor or central processing unit (CPU), a virtual instantiation of a processor on physical circuitry included in a microprocessor or CPU, or combinations thereof. The term processor circuit may refer to a single- or multi-thread processor core circuit.

FIG. 1 is a block diagram of an illustrative system 100 that includes selection circuitry 110 that causes scheduling circuitry 120 to dynamically schedule each of a plurality of threads $140_1$-$140_n$ (collectively, "threads 140") for execution by processor circuitry 130 based at least in part on class of service data assigned by an operating system 150 and stored in one or more model specific registers $160_1$-$160_n$ (collectively, "MSRs 160") associated with respective ones of the plurality of threads $140_1$-$140_n$, in accordance with at least one embodiment described herein. In embodiments, each of the plurality of threads 140 may be executed by processor circuitry 130 that includes a plurality of processor core circuits (e.g., processor circuitry 130 that includes 4, 8, 16, or 32 or more cores). In other embodiments, although not depicted in FIG. 1, at least some of the plurality of threads may be executed by processor core circuitry dispersed across a plurality of processor circuits $170_1$-$170_n$.

In operation, the operating system 150 determines one or more values indicative of a class of service associated with each of the plurality of threads 140. Data representative of these class of service values are then stored in one or more MSRs 160 associated with the respective thread 140. As each of the threads 140 execute, the operating system 150 may dynamically alter or adjust the class of service data associated with each of some or all of the threads 140. The operating system 150 may dynamically adjust the class of service values for some or all of the threads 140 on a periodic, aperiodic, intermittent, or continuous basis. The operating system 150 may dynamically adjust the class of service values for some or all of the threads 140 in response to one or more events (i.e., an event-driven basis), such as instantiation of a new thread $140_{new}$ or termination of an existing thread 140.

The selection circuitry 110 polls the MSRs 160 to obtain the class of service value(s) associated with each of the plurality of threads 140. In embodiments, the selection circuitry 110 may poll the MSRs 160 on a periodic, aperiodic, intermittent, or continuous basis. In other embodiments, the selection circuitry 110 may poll the MSRs 160 in response to one or more events (i.e., an event-driven basis), such as instantiation of a new thread 140 or termination of an existing thread 140. Using the class of service values assigned by the operating system 150 and associated with each thread 140, the selection circuitry 110 orders, sequences, or otherwise arranges the execution sequence for each of the plurality of threads 140. The selection circuitry 110 then causes the scheduling circuitry 120 to schedule the execution of some or all of the threads by the processor circuitry 130.

As the operating system 150 dynamically adjusts the class of service associated with each of some or all of the plurality of threads 140, the selection circuitry 110 also dynamically adjusts the order of execution of each of some or all of the plurality of threads 140. Thus, for example, as the value representative of the class of service associated with a thread 140 increases, the selection circuitry 110 may move the respective thread upward in the execution order such that the respective thread 140 is executed prior to other threads having a lower class of service/execution priority. Conversely, as the value representative of the class of service associated with a thread 140 decreases, the selection circuitry 110 may move the respective thread downward in the execution order such that the respective thread 140 is executed subsequent to other threads having a higher class of service/execution priority.

The selection circuitry 110 includes any number and/or combination of currently available or future developed electronic components, semiconductor devices, and/or logic elements capable of polling and/or receiving class of service data from one or more MSRs associated with each of a plurality of threads 140, using the received class of service data to determine an execution order for each of at least some of the plurality of threads 140, and causing scheduling circuitry 120 schedule the execution of some or all of the plurality of threads by the processor circuitry 130. In embodiments, the processor circuitry 130 may provide all or a portion of the selection circuitry 110. In yet other embodiments, the selection circuitry 110 may be implemented as an application specific integrated circuit (ASIC) that is included in a system-on-chip (SoC) semiconductor package or a multi-chip module (MCM) semiconductor package.

In operation, the selection circuitry 110 receives class of service information and/or data from at least a portion of the MSRs $160_1$-$160_n$ associated with respective ones of the plurality of threads $140_1$-$140_n$, via bus 180. In embodiments, the class of service information and/or data is pushed, for example by the processor circuitry 130, to the selection circuitry 110. In other embodiments, the class of service information and/or data is polled by the selection circuitry 110. The class of service information may include but is not limited to: information and/or data representative of a quality of service (QoS) prioritization assigned by the operating system 150 to the respective thread 140 and/or information representative of a hardware-coordinated performance state (HWP) associated with the respective thread 140. The selection circuitry 110 receives the class of service information and/or data on a periodic, aperiodic, intermittent, continuous, or event-driven basis. An event-driven basis may include, for example, a notification received by the selection circuitry 110 indicative of an instantiation of a new thread 140 or a termination of an existing thread 140. Such notifications may be generated and/or communicated by the processor circuitry 130 and/or the operating system 150.

The selection circuitry 110 determines the execution sequence for each of some or all of the plurality of threads 140 using the class of service information stored in the MSRs 160. In embodiments, where the data stored in the MSRs 160 indicates a similar or identical class of service for two or more threads 140 (e.g., a QoS prioritization value assigned by the operating system) the selection circuitry 110 may schedule the execution of such threads on a temporal basis where relatively older threads 140 are executed before relatively newer threads (i.e., on a first in/first out basis). In embodiments, threads 140 assigned or associated with a relatively higher or greater class of service may be scheduled for execution relatively sooner than threads 140 assigned or associated with a relatively lower or lesser class of service.

The scheduling circuitry 120 includes any number and/or combination of currently available or future developed electronic components, semiconductor devices, and/or logic elements capable of scheduling the execution of each of the plurality of threads 140 by the processor circuitry 130. In embodiments, the processor circuitry 130 provides all or a portion of the scheduling circuitry 120. In yet other embodiments, the scheduling circuitry 120 may be implemented as an application specific integrated circuit (ASIC) that is included in a system-on-chip (SoC) semiconductor package or a multi-chip module (MCM) semiconductor package.

In operation, the scheduling circuitry 120 receives thread execution sequence and/or prioritization information from the selection circuitry 110. Using the received execution and/or prioritization information, the scheduling circuitry 120 schedules the execution of the threads by the processor circuitry 130 based on the received thread execution sequence and/or prioritization information.

The processor circuitry 130 includes any number and/or combination of currently available or future developed electronic components, semiconductor devices, and/or logic elements capable of executing machine-readable instruction sets associated with the operating system 150 and one or more processes or applications capable of providing the plurality of threads 140. The processor circuitry 130 may include a microprocessor having one or more processor core circuits. In embodiments, each of the processor core circuits may support the execution of one or more threads 140. In embodiments, the processor circuitry 130 may include one or more application specific integrated circuits (ASIC); one or more field programmable gate arrays (FPGA); one or more digital signal processors (DSP); one or more reduced instruction set computers (RISC); one or more microprocessors; and/or one or more controllers. In embodiments, some or all of the processor circuitry 130, the selection circuitry 110, the scheduling circuitry 120, and/or the hardware resource 130 may be disposed within a common semiconductor package, such as a system-on-chip (SoC) or a multi-chip module (MCM).

The processor circuitry 130 simultaneously executes all or a portion of the plurality of threads 140. In embodiments, the processor circuitry 130 includes a microprocessor having one or more processor core circuits. In such embodiments, each of the core circuits executes one or more of the threads 140 included in the plurality of threads 140. In embodiments, each thread 140 is generated by an application or process initiated by an operating system 150 executed by the processor circuitry 130. The operating system 150 assigns each of the plurality of threads 140 a respective class of service. For each of the plurality of threads 140, a plurality of MSRs $160_1$-$160_n$ store data representative of the class of service associated with the respective thread 140. The operating system 150 may, at times, alter, change, or update the class of service associated with some or all of the plurality of threads 140 as threads are executed, instantiated, and/or terminated. The operating system 150 stores the updated class of service data in the MSRs 160. In operation, the selection circuitry 110 receives such updated class of service information from the MSRs 160 and adjusts the thread execution sequence accordingly. For example, a thread 140 having a relatively lower class of service may be scheduled behind a thread 140 having a relatively higher class of service.

The operating system 150 may include any currently available or future developed instruction set capable of causing the processor circuitry 130 to execute applications or processes that create the plurality of threads 140. The operating system 150 dynamically generates respective class of service information and/or data for each of the plurality of threads 140 executed by the processor circuitry 130. The operating system 150 and/or the processor circuitry 130 dynamically updates the class of service information and/or data associated with some or all of the plurality of threads 140 on a periodic, aperiodic, intermittent, or continuous basis as each thread executes. The operating system 150 stores the class of service information for each of the plurality of threads 140 in one or more MSRs 160 that are associated with the respective thread 140. In embodiments, the operating system 150 and/or the processor circuitry 130 dynamically updates the class of service information and/or data associated with some or all of the plurality of threads 140 in response to an occurrence of one or more events, such as instantiation of a new thread 140 or termination of an existing thread 140. The Windows Operating System (Microsoft Corp., REDMOND, Wash.) provides an example operating system 150. Those of skill in the relevant arts will readily appreciate the cross-platform applicability of the systems and methods disclosed herein for any operating system capable of providing a dynamic provision of class of service data for each of a plurality of threads 140.

Figure 2:
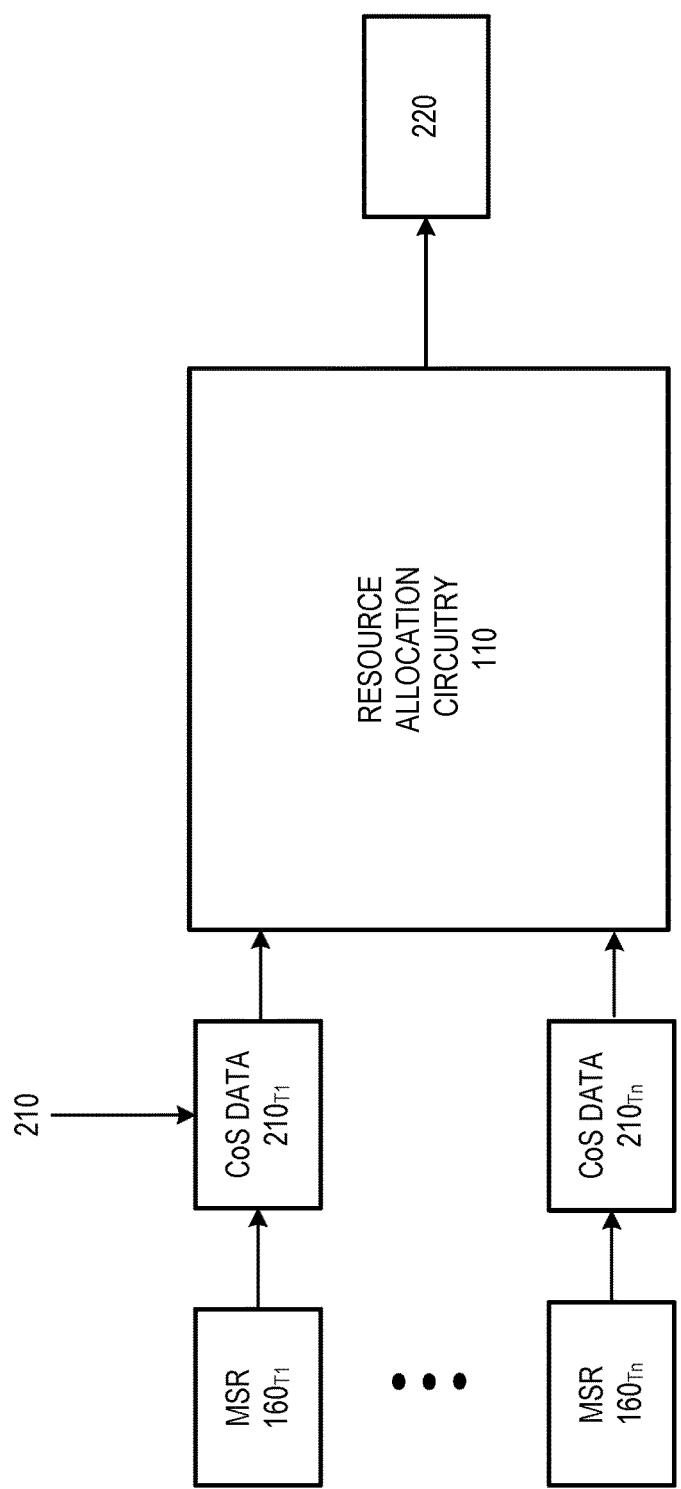
FIG. 2 is an input/output block diagram of illustrative system that includes the input signals to the selection circuitry and at least one output signal from the selection circuitry to the scheduling circuitry, in accordance with at least one embodiment described herein.

FIG. 2 is an input/output block diagram of illustrative system 200 that includes the input signals $210_{T1}$-$210_{Tn}$. (collectively, "input signals 210") to the selection circuitry 110 and at least one output signal 220 from the selection circuitry 110 to the scheduling circuitry 120, in accordance with at least one embodiment described herein. As depicted in FIG. 2, the selection circuitry 110 receives, from each of a plurality of MSRs 160, a plurality of input signals 210 containing information and/or data indicative of the class of service associated with each of the plurality of threads 140. In embodiments, the operating system 150 may generate the class of service information and/or data and cause the storage of the class of service information and/or data in the MSRs 160 associated with each respective one of the plurality of threads 140. In embodiments, the operating system 150 may dynamically change, alter, correct, or update the class of service information and/or data for some or all of the threads included in the plurality of threads 140. Thus, while each of the plurality of threads 140 executes, the operating system 150 may increase or decrease the class of service of one or more threads 140. The selection circuitry 110 may poll the MSRs 160 to obtain input signals 210 on a periodic, aperiodic, intermittent, continuous, or event-driven basis. Similarly, the selection circuitry 110 may communicate one or more output signals 220 containing thread execution sequence information and/or data to the scheduling circuitry 120 on a periodic, aperiodic, intermittent, continuous, or event-driven basis.

In a hypothetical example, if an operating system 150 provides three classes of service (high, medium, and low), the operating system 150 will assign each of the plurality of threads 140 executing in the processor circuitry 130 a class of service value that is then stored in the MSR 160 associated with the respective thread 140. The selection circuitry 110 receives this class of service information for each of the plurality of threads 140 as input signals $210_{T1}$-$210_{Tn}$. Using the received class of service information, the selection circuitry 110 determines a thread execution sequence. For example, if 5 threads are executing, with 2 threads ($140_1$ and $140_2$) having a high class of service, 2 threads ($140_3$ and $140_4$) having a medium class of service and one thread ($140_5$) having a low class of service, the selection circuitry 110 will schedule the two high class of service threads $140_1$ and $140_2$ first and second based on the age of the thread (oldest thread first); the two medium class of service threads $140_3$ and $140_4$ third and fourth (oldest thread first); and the low class of service thread $140_5$ last.

The selection circuitry 110 generates one or more output signals 220 that are communicated to the scheduling circuitry 120. The one or more output signals 220 contain information indicative of thread execution sequence determined by the selection circuitry 110 based on the operating system assigned class of service data received from the MSRs 160. The scheduling circuitry 120 uses the information contained in the one or more output signals 220 to schedule the execution of some or all of the plurality of threads 140 by the processor circuitry 130.

Figure 3:
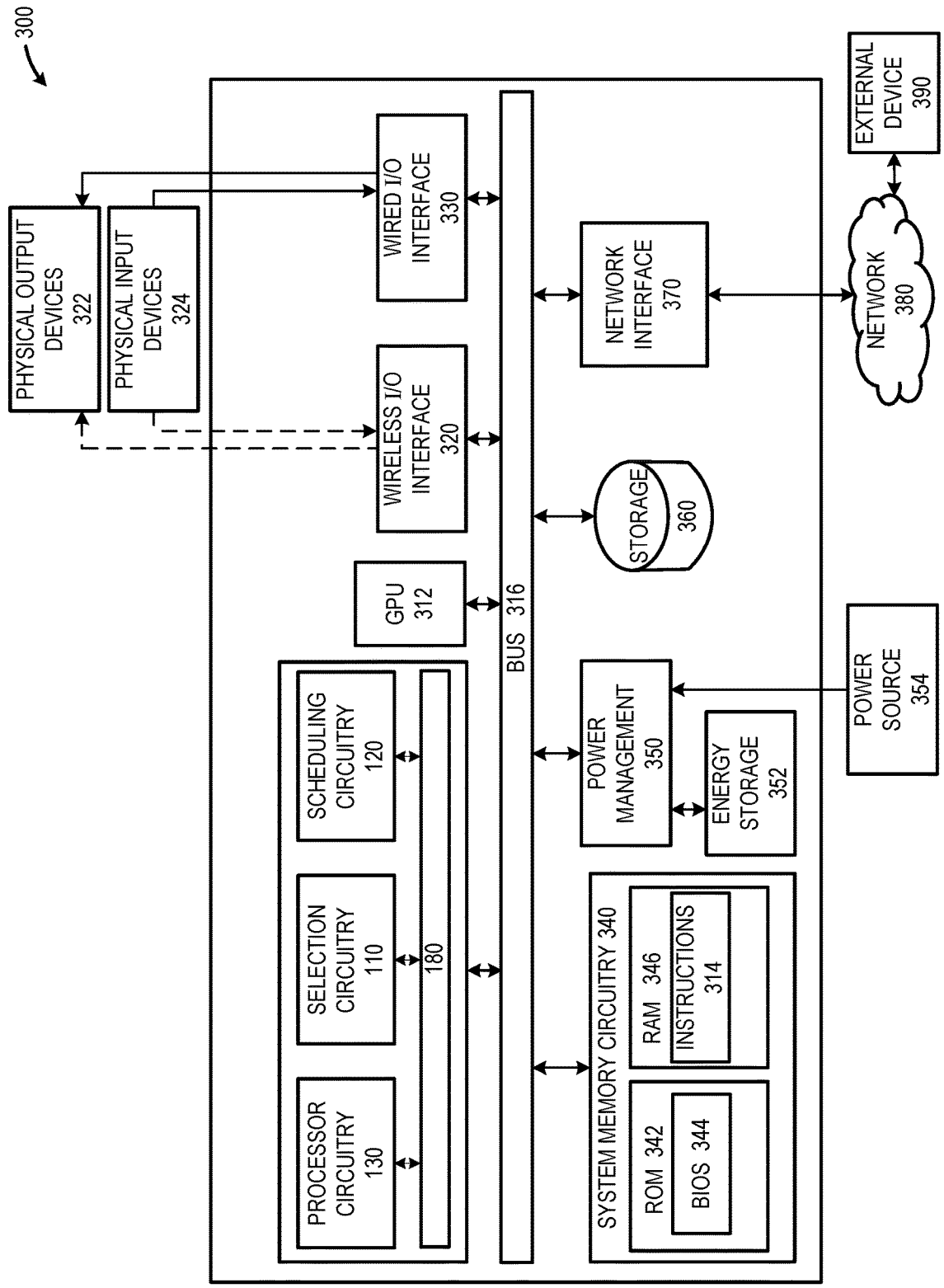
FIG. 3 is a schematic diagram of an illustrative electronic, processor-based, device that includes selection circuitry, scheduling circuitry, and processor circuitry, in accordance with at least one embodiment described herein.

FIG. 3 is a schematic diagram of an illustrative electronic, processor-based, device 300 that includes selection circuitry 110, scheduling circuitry 120, and processor circuitry 130, in accordance with at least one embodiment described herein. In embodiments, the processor-based device 300 may include a server computer system or a component included in a server computer system, such as a blade server. The processor-based device 300 may additionally include one or more of the following: a wireless input/output (I/O) interface 320, a wired I/O interface 330, system memory circuitry 340, power management circuitry 350, a network interface 370, and a non-transitory storage device 390. The following discussion provides a brief, general description of the components forming the illustrative processor-based device 300. Example, non-limiting processor-based devices 300 may include, but are not limited to: smartphones, wearable computers, portable computing devices, handheld computing devices, desktop computing devices, blade server devices, workstations, and similar.

Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuits 160 may include any number of hardwired or configurable circuits, some or all of which may include programmable and/or configurable combinations of electronic components, semiconductor devices, and/or logic elements that are disposed partially or wholly in a cloud-based server or other similar computing systems and/or devices capable of executing processor-readable instructions.

The processor-based device 300 includes a bus or similar communications link 316 that communicably couples and facilitates the exchange of information and/or data between various system components including the processor circuitry 130, the one or more wireless I/O interfaces 320, the one or more wired I/O interfaces 330, the system memory circuitry 340, the one or more network interfaces 370, and/or the one or more storage devices 390. The processor-based device 300 may be referred to in the singular herein, but this is not intended to limit the embodiments to a single processor-based device 300, since in certain embodiments, there may be more than one processor-based device 300 that incorporates, includes, or contains any number of communicatively coupled, collocated, or remote networked circuits or devices.

The processor circuitry 130 may include any number, type, or combination of currently available or future developed devices capable of executing machine-readable instruction sets. The processor circuitry 130 may include individual single- or multi-thread cores disposed in one or more CPUs. The processor circuitry 130 may include but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 3 are of conventional design. Consequently, such blocks need not be described in further detail herein, as they will be understood by those skilled in the relevant art. The bus 316 that interconnects at least some of the components of the processor-based device 300 may employ any currently available or future developed serial or parallel bus structures or architectures.

The system memory circuitry 340 may include read-only memory ("ROM") 342 and random access memory ("RAM") 346. A portion of the ROM 342 may be used to store or otherwise retain a basic input/output system ("BIOS") 344. In embodiments, at least some of the one or more machine-readable instruction sets 314 cause at least a portion of the processor circuitry 130 to provide, create, produce, transition, and/or function as a dedicated, specific, and particular machine, for example a word processing machine, a digital image acquisition machine, a media playing machine, a gaming system, a communications device, a smartphone, or similar.

The processor-based device 300 may include at least one wireless input/output (I/O) interface 320. The at least one wireless I/O interface 320 may be communicably coupled to one or more physical output devices 322 (tactile devices, video displays, audio output devices, hardcopy output devices, etc.). The at least one wireless I/O interface 320 may communicably couple to one or more physical input devices 324 (pointing devices, touchscreens, keyboards, tactile devices, etc.). The at least one wireless I/O interface 320 may include any currently available or future developed wireless I/O interface. Example wireless I/O interfaces include, but are not limited to: BLUETOOTH®, near field communication (NFC), and similar.

The processor-based device 300 may include one or more wired input/output (I/O) interfaces 330. The at least one wired I/O interface 330 may be communicably coupled to one or more physical output devices 322 (tactile devices, video displays, audio output devices, hardcopy output devices, etc.). The at least one wired I/O interface 330 may be communicably coupled to one or more physical input devices 324 (pointing devices, touchscreens, keyboards, tactile devices, etc.). The wired I/O interface 330 may include any currently available or future developed I/O interface. Example wired I/O interfaces include, but are not limited to: universal serial bus (USB), IEEE 1394 ("FireWire"), and similar.

The processor-based device 300 may include one or more communicably coupled, non-transitory, data storage devices 360. The data storage devices 360 may include one or more hard disk drives (HDDs) and/or one or more solid-state storage devices (SSDs). The data storage devices 360 may be disposed local to the processor circuitry 130 or may be disposed remote from the processor circuitry 130, for example the processor circuitry 130 may be disposed on a first rack-mount blade server and the storage devices 360 may be disposed on a second rack-mount blade installed in the same or a different rack. The one or more data storage devices 360 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 360 may include one or more removable storage devices, such as one or more flash drives, flash memories, flash storage units, or similar appliances or devices capable of communicable coupling to and decoupling from the processor-based device 300.

The one or more data storage devices 360 may include interfaces or controllers (not shown) communicatively coupling the respective storage device or system to the bus 316. The one or more data storage devices 360 may store, retain, or otherwise contain machine-readable instruction sets, data structures, program modules, data stores, databases, logical structures, and/or other data useful to the processor circuitry 130 and/or one or more applications executed on or by the processor circuitry 130. In some instances, one or more data storage devices 360 may be communicably coupled to the processor circuitry 130, for example via the bus 316 or via one or more wired communications interfaces 330 (e.g., Universal Serial Bus or USB); one or more wireless communications interfaces 320 (e.g., Bluetooth®, Near Field Communication or NFC); and/or one or more network interfaces 370 (IEEE 802.3 or Ethernet, IEEE 802.11, or WiFi®, etc.).

Processor-readable instruction sets 314 and other programs, applications, logic sets, and/or modules may be stored in whole or in part in the system memory circuitry 170. Such instruction sets 314 may be transferred, in whole or in part, from the one or more data storage devices 360. The instruction sets 314 may be loaded, stored, or otherwise retained in system memory circuitry 340, in whole or in part, during execution by the processor circuitry 130.

The processor-based device 300 may include power management circuitry 350 that controls one or more operational aspects of the energy storage device 352. In embodiments, the energy storage device 352 may include one or more primary (i.e., non-rechargeable) or secondary (i.e., rechargeable) batteries or similar energy storage devices. In embodiments, the energy storage device 352 may include one or more supercapacitors or ultracapacitors. In embodiments, the power management circuitry 350 may alter, adjust, or control the flow of energy from an external power source 354 to the energy storage device 352 and/or to the processor-based device 300. The power source 354 may include, but is not limited to, a solar power system, a commercial electric grid, a portable generator, an external energy storage device, or any combination thereof.

For convenience, the processor circuitry 130, the wireless I/O interface 320, the wired I/O interface 330, the system memory 340, the power management circuitry 350, the storage device 360, and the network interface 370 are illustrated as communicatively coupled to each other via the bus 316, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In another example, one or more of the above-described components may be integrated into the processor circuitry 130. In some embodiments, all or a portion of the bus 316 may be omitted and the components are coupled directly to each other using suitable wired or wireless connections.

Figure 4:
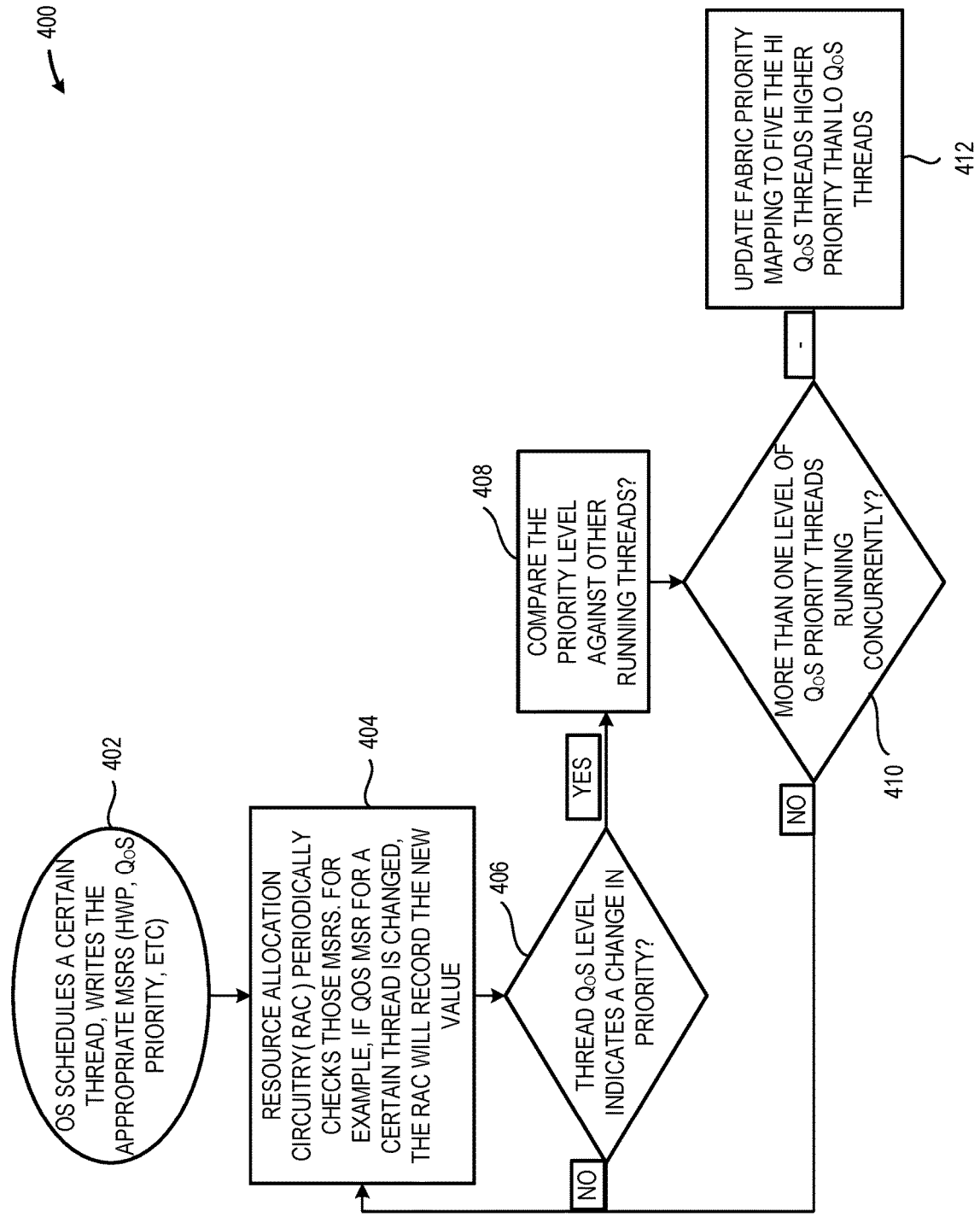
FIG. 4 is a high level flow diagram of an illustrative method in which selection circuitry receives class of service information associated with each of a plurality of threads and causes scheduling circuitry to dynamically schedule the execution of at least some of the plurality of threads based, at least in part, on the received class of service information, in accordance with at least one embodiment described herein.

FIG. 4 is a high level flow diagram of an illustrative method 400 in which selection circuitry 110 receives class of service information associated with each of a plurality of threads 140 and causes scheduling circuitry 120 to dynamically schedule the execution of at least some of the plurality of threads 140 based, at least in part, on the received class of service information, in accordance with at least one embodiment described herein. The method 400 commences at 402.

At 402, an operating system 150 causes the execution of one or more threads 140 by processor circuitry 130. The operating system 150 determines the class of service associated with each of the one or more threads 140 and writes data representative of the determined class of service in one or more MSRs 160 associated respective ones of the one or more threads 140. In embodiments, the data representative of the determined class of service may include but is not limited to: QoS prioritization data and/or hardware-coordinated performance state (HWP) data.

At 404, the selection circuitry 110 polls the MSRs 160 to determine the class of service assigned by the operating system 150 to each of the plurality of threads 140. As the threads 140 execute, the selection circuitry 110 polls the MSRs 160 to determine whether the operating system 150 has updated, changed, or altered the class of service associated with any of the threads 140. In embodiments, the selection circuitry 110 may poll some or all of the MSRs 160 on a periodic, aperiodic, intermittent, continuous, or event-driven basis.

At 406, the selection circuitry 110 determines whether the data received from the MSRs 160 associated with each of the plurality of threads 140 is indicative of a change in the class of service (e.g., a change in the QoS priority) associated with the respective thread 140. If the selection circuitry 110 determines the class of service (e.g., the QoS priority) remains unchanged, the method returns to 404. If the selection circuitry 110 determines the class of service has changed, the method proceeds to 408.

At 408, the selection circuitry 110 compares the determined class of service of each thread 140 with the determined class of service for each remaining thread.

At 410, the selection circuitry 110 determines whether the different classes of service exist between all of the threads. If all threads 140 have the same determined class of service, the selection circuitry 110 prioritizes the execution of the same class of service threads 140 based on the age of the thread (older threads are executed first). If some threads 140 have a higher class of service than other threads 140, the selection circuitry 110 prioritizes the execution of the threads 140 such that the threads 140 having the relatively higher class of service are executed prior to threads 140 having a relatively lower class of service.

At 412, the selection circuitry 110 communicates data representative of the prioritized thread execution for the plurality of threads 140 to the scheduling circuitry 120. The scheduling circuitry 120 uses the data representative of the prioritized thread execution to schedule the execution of some or all of the plurality of threads 140 by the processor circuitry 130.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below.

Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 5B:
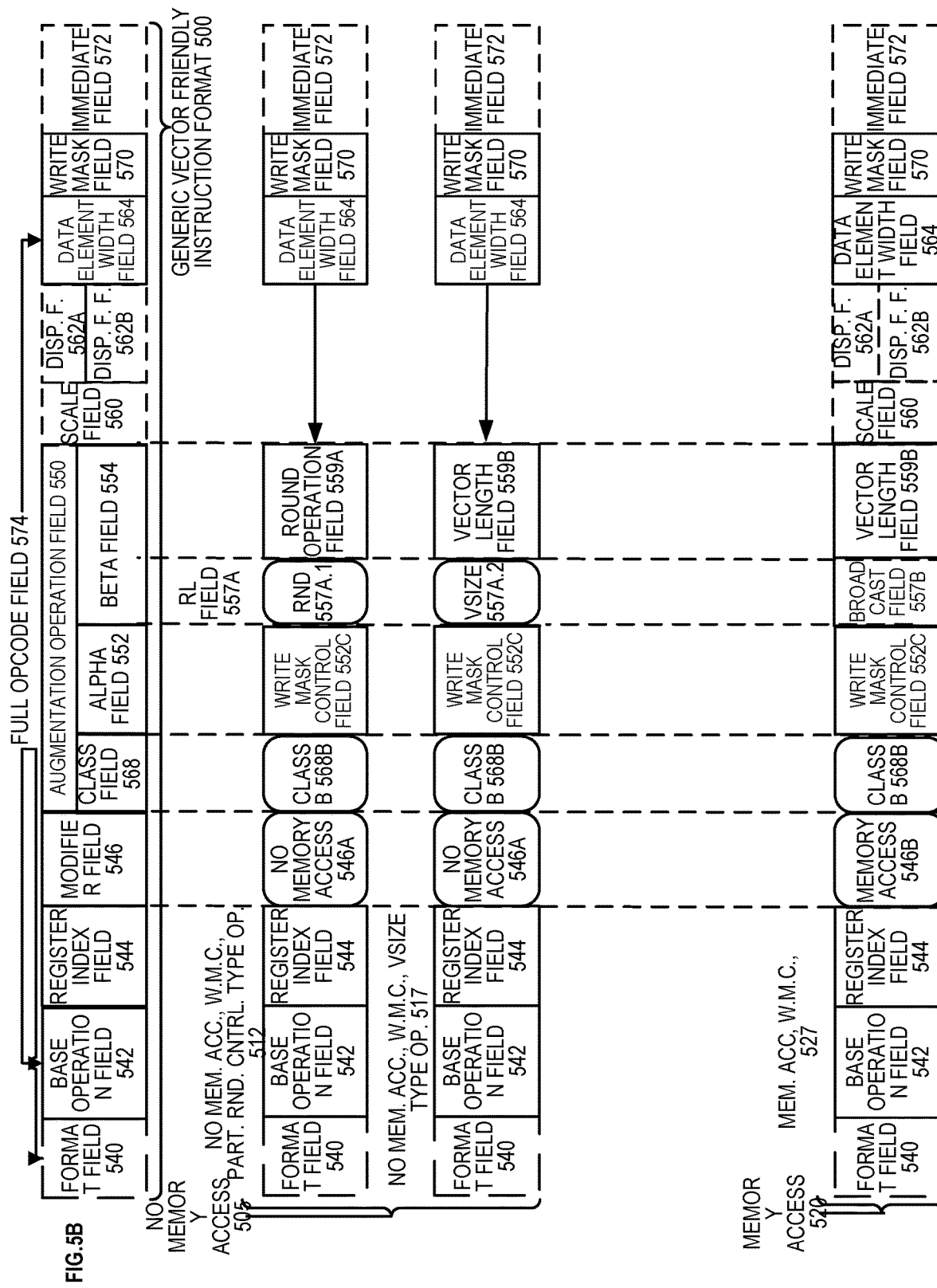

FIGS. 5A and 5B are block diagrams illustrating a generic vector friendly instruction format and instruction templates thereof according to embodiments of the invention. FIG. 5A is a block diagram illustrating a generic vector friendly instruction format and class A instruction templates thereof according to embodiments of the invention; while FIG. 5B is a block diagram illustrating the generic vector friendly instruction format and class B instruction templates thereof according to embodiments of the invention. Specifically, a generic vector friendly instruction format 500 for which are defined class A and class B instruction templates, both of which include no memory access 505 instruction templates and memory access 520 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 5A include: 1) within the no memory access 505 instruction templates there is shown a no memory access, full round control type operation 510 instruction template and a no memory access, data transform type operation 515 instruction template; and 2) within the memory access 520 instruction templates there is shown a memory access, temporal 525 instruction template and a memory access, non-temporal 530 instruction template. The class B instruction templates in FIG. 5B include: 1) within the no memory access 705 instruction templates there is shown a no memory access, write mask control, partial round control type operation 512 instruction template and a no memory access, write mask control, vsize type operation 517 instruction template; and 2) within the memory access 520 instruction templates there is shown a memory access, write mask control 527 instruction template.

The generic vector friendly instruction format 500 includes the following fields listed below in the order illustrated in FIGS. 5A-5B.

Format field 540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 542—its content distinguishes different base operations.

Register index field 544—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 546—its content distinguishes occurrences of instructions in the generic vector instruction format that specify memory access from those that do not; that is, between no memory access 505 instruction templates and memory access 520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 550—its content distinguishes which one of a variety of different operations to be performed in addition to the base operation. This field is context specific. In one embodiment of the invention, this field is divided into a class field 568, an alpha field 552, and a beta field 554. The augmentation operation field 550 allows common groups of operations to be performed in a single instruction rather than 2, 3, or 4 instructions.

Scale field 560—its content allows for the scaling of the index field's content for memory address generation (e.g., for address generation that uses $2^{scale}*\text{index}+\text{base}$).

Displacement Field 562A—its content is used as part of memory address generation (e.g., for address generation that uses $2^{scale}*\text{index}+\text{base}+\text{displacement}$).

Displacement Factor Field 562B (note that the juxtaposition of displacement field 562A directly over displacement factor field 562B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 574 (described later herein) and the data manipulation field 554C. The displacement field 562A and the displacement factor field 562B are optional in the sense that they are not used for the no memory access 505 instruction templates and/or different embodiments may implement only one or none of the two.

Data element width field 564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 570 allows for partial vector operations, including loads, stores, arithmetic, logical, etc. While embodiments of the invention are described in which the write mask field's 570 content selects one of a number of write mask registers that contains the write mask to be used (and thus the write mask field's 570 content indirectly identifies that masking to be performed), alternative embodiments instead or additional allow the mask write field's 570 content to directly specify the masking to be performed.

Immediate field 572—its content allows for the specification of an immediate. This field is optional in the sense that is it not present in an implementation of the generic vector friendly format that does not support immediate and it is not present in instructions that do not use an immediate.

Class field 568—its content distinguishes between different classes of instructions. With reference to FIGS. 5A and 5B, the contents of this field select between class A and class B instructions. In FIGS. 5A and 5B, rounded corner squares are used to indicate a specific value is present in a field (e.g., class A 568A and class B 568B for the class field 568 respectively in FIGS. 5A and 5B).

Instruction Templates of Class A

In the case of the non-memory access 505 instruction templates of class A, the alpha field 552 is interpreted as an RS field 552A, whose content distinguishes which one of the different augmentation operation types are to be performed (e.g., round 552A.1 and data transform 552A.2 are respectively specified for the no memory access, round type operation 510 and the no memory access, data transform type operation 515 instruction templates), while the beta field 554 distinguishes which of the operations of the specified type is to be performed. In the no memory access 505 instruction templates, the scale field 560, the displacement field 562A, and the displacement scale filed 762B are not present.

No-Memory Access Instruction Templates—Full Round Control Type Operation

In the no memory access full round control type operation 510 instruction template, the beta field 554 is interpreted as a round control field 554A, whose content(s) provide static rounding. While in the described embodiments of the invention the round control field 554A includes a suppress all floating point exceptions (SAE) field 556 and a round operation control field 558, alternative embodiments may support may encode both these concepts into the same field or only have one or the other of these concepts/fields (e.g., may have only the round operation control field 558).

SAE field 556—its content distinguishes whether or not to disable the exception event reporting; when the SAE field's 556 content indicates suppression is enabled, a given instruction does not report any kind of floating-point exception flag and does not raise any floating point exception handler.

Round operation control field 558—its content distinguishes which one of a group of rounding operations to perform (e.g., Round-up, Round-down, Round-towards-zero and Round-to-nearest). Thus, the round operation control field 558 allows for the changing of the rounding mode on a per instruction basis. In one embodiment of the invention where a processor includes a control register for specifying rounding modes, the round operation control field's 550 content overrides that register value.

No Memory Access Instruction Templates—Data Transform Type Operation

In the no memory access data transform type operation 515 instruction template, the beta field 554 is interpreted as a data transform field 554B, whose content distinguishes which one of a number of data transforms is to be performed (e.g., no data transform, swizzle, broadcast).

In the case of a memory access 520 instruction template of class A, the alpha field 552 is interpreted as an eviction hint field 552B, whose content distinguishes which one of the eviction hints is to be used (in FIG. 5A, temporal 552B.1 and non-temporal 552B.2 are respectively specified for the memory access, temporal 525 instruction template and the memory access, non-temporal 530 instruction template), while the beta field 554 is interpreted as a data manipulation field 554C, whose content distinguishes which one of a number of data manipulation operations (also known as primitives) is to be performed (e.g., no manipulation; broadcast; up conversion of a source; and down conversion of a destination). The memory access 520 instruction templates include the scale field 560, and optionally the displacement field 562A or the displacement scale field 562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 552 is interpreted as a write mask control (Z) field 552C, whose content distinguishes whether the write masking controlled by the write mask field 570 should be a merging or a zeroing.

In the case of the non-memory access 505 instruction templates of class B, part of the beta field 554 is interpreted as an RL field 557A, whose content distinguishes which one of the different augmentation operation types are to be performed (e.g., round 557A.1 and vector length (VSIZE) 557A.2 are respectively specified for the no memory access, write mask control, partial round control type operation 512 instruction template and the no memory access, write mask control, VSIZE type operation 517 instruction template), while the rest of the beta field 554 distinguishes which of the operations of the specified type is to be performed. In the no memory access 505 instruction templates, the scale field 560, the displacement field 562A, and the displacement scale filed 562B are not present.

In the no memory access, write mask control, partial round control type operation 510 instruction template, the rest of the beta field 554 is interpreted as a round operation field 559A and exception event reporting is disabled (a given instruction does not report any kind of floating-point exception flag and does not raise any floating point exception handler).

Round operation control field 559A—just as round operation control field 558, its content distinguishes which one of a group of rounding operations to perform (e.g., Round-up, Round-down, Round-towards-zero and Round-to-nearest). Thus, the round operation control field 559A allows for the changing of the rounding mode on a per instruction basis. In one embodiment of the invention where a processor includes a control register for specifying rounding modes, the round operation control field's 550 content overrides that register value.

In the no memory access, write mask control, VSIZE type operation 517 instruction template, the rest of the beta field 554 is interpreted as a vector length field 559B, whose content distinguishes which one of a number of data vector lengths is to be performed on (e.g., 128, 256, or 512 byte).

In the case of a memory access 520 instruction template of class B, part of the beta field 554 is interpreted as a broadcast field 557B, whose content distinguishes whether or not the broadcast type data manipulation operation is to be performed, while the rest of the beta field 554 is interpreted the vector length field 559B. The memory access 520 instruction templates include the scale field 560, and optionally the displacement field 562A or the displacement scale field 562B.

With regard to the generic vector friendly instruction format 500, a full opcode field 574 is shown including the format field 540, the base operation field 542, and the data element width field 564. While one embodiment is shown where the full opcode field 574 includes all of these fields, the full opcode field 574 includes less than all of these fields in embodiments that do not support all of them. The full opcode field 574 provides the operation code (opcode).

The augmentation operation field 550, the data element width field 564, and the write mask field 570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 6 is a block diagram illustrating an exemplary specific vector friendly instruction format according to embodiments of the invention. FIG. 6 shows a specific vector friendly instruction format 600 that is specific in the sense that it specifies the location, size, interpretation, and order of the fields, as well as values for some of those fields. The specific vector friendly instruction format 600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 5 into which the fields from FIG. 6 map are illustrated.

It should be understood that, although embodiments of the invention are described with reference to the specific vector friendly instruction format 600 in the context of the generic vector friendly instruction format 500 for illustrative purposes, the invention is not limited to the specific vector friendly instruction format 600 except where claimed. For example, the generic vector friendly instruction format 500 contemplates a variety of possible sizes for the various fields, while the specific vector friendly instruction format 600 is shown as having fields of specific sizes. By way of specific example, while the data element width field 564 is illustrated as a one bit field in the specific vector friendly instruction format 600, the invention is not so limited (that is, the generic vector friendly instruction format 500 contemplates other sizes of the data element width field 564).

The generic vector friendly instruction format 500 includes the following fields listed below in the order illustrated in FIG. 6A.

EVEX Prefix (Bytes 0-3) 602—is encoded in a four-byte form.

Format Field 540 (EVEX Byte 0, bits [7:0])—the first byte (EVEX Byte 0) is the format field 540 and it contains 0x62 (the unique value used for distinguishing the vector friendly instruction format in one embodiment of the invention).

The second-fourth bytes (EVEX Bytes 1-3) include a number of bit fields providing specific capability.

REX field 605 (EVEX Byte 1, bits [7-5])—consists of a EVEX.R bit field (EVEX Byte 1, bit [7]—R), EVEX.X bit field (EVEX byte 1, bit [6]—X), and 557BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 510—this is the first part of the REX' field 510 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 615 (EVEX byte 1, bits [3:0]—mmmm)—its content encodes an implied leading opcode byte (0F, 0F 38, or 0F 3).

Data element width field 564 (EVEX byte 2, bit [7]—W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 820 encodes the 4 low-order bits of the first source register specifier stored in inverted (1s complement) form. Depending on the instruction, an extra different EVEX bit field is used to extend the specifier size to 32 registers.

EVEX.U 568 Class field (EVEX byte 2, bit [2]—U)—If EVEX.U=0, it indicates class A or EVEX.U0; if EVEX.U=1, it indicates class B or EVEX.U1.

Prefix encoding field 625 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 552 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 554 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 510—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 570 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 630 (Byte 4) is also known as the opcode byte. Part of the opcode is specified in this field.

MOD R/M Field 640 (Byte 5) includes MOD field 642, Reg field 644, and R/M field 646. As previously described, the MOD field's 842 content distinguishes between memory access and non-memory access operations. The role of Reg field 644 can be summarized to two situations: encoding either the destination register operand or a source register operand, or be treated as an opcode extension and not used to encode any instruction operand. The role of R/M field 646 may include the following: encoding the instruction operand that references a memory address, or encoding either the destination register operand or a source register operand.

Scale, Index, Base (SIB) Byte (Byte 6)—As previously described, the scale field's 550 content is used for memory address generation. SIB.xxx 654 and SIB.bbb 656—the contents of these fields have been previously referred to with regard to the register indexes Xxxx and Bbbb.

Displacement field 562A (Bytes 7-10)—when MOD field 842 contains 10, bytes 7-10 are the displacement field 562A, and it works the same as the legacy 32-bit displacement (disp32) and works at byte granularity.

Displacement factor field 562B (Byte 7)—when MOD field 842 contains 01, byte 7 is the displacement factor field 562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 562B is a reinterpretation of disp8;

when using displacement factor field 762B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 562B substitutes the legacy x86 instruction set 8-bit displacement. Thus, the displacement factor field 562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 572 operates as previously described.

Full Opcode Field

FIG. 6B is a block diagram illustrating the fields of the specific vector friendly instruction format 600 that make up the full opcode field 574 according to one embodiment of the invention. Specifically, the full opcode field 574 includes the format field 540, the base operation field 542, and the data element width (W) field 564. The base operation field 542 includes the prefix encoding field 625, the opcode map field 615, and the real opcode field 630.

Register Index Field

FIG. 6C is a block diagram illustrating the fields of the specific vector friendly instruction format 800 that make up the register index field 544 according to one embodiment of the invention. Specifically, the register index field 744 includes the REX field 605, the REX' field 610, the MODR/M.reg field 644, the MODR/M.r/m field 846, the VVVV field 620, xxx field 654, and the bbb field 656.

Augmentation Operation Field

FIG. 6D is a block diagram illustrating the fields of the specific vector friendly instruction format 600 that make up the augmentation operation field 550 according to one embodiment of the invention. When the class (U) field 568 contains 0, it signifies EVEX.U0 (class A 568A); when it contains 1, it signifies EVEX.U1 (class B 568B). When U=0 and the MOD field 642 contains 11 (signifying a no memory access operation), the alpha field 552 (EVEX byte 3, bit [7]—EH) is interpreted as the rs field 552A. When the rs field 552A contains a 1 (round 552A.1), the beta field 554 (EVEX byte 3, bits [6:4]—SSS) is interpreted as the round control field 554A. The round control field 554A includes a one bit SAE field 556 and a two bit round operation field 558. When the rs field 552A contains a 0 (data transform 552A.2), the beta field 554 (EVEX byte 3, bits [6:4]—SSS) is interpreted as a three bit data transform field 754B. When U=0 and the MOD field 642 contains 00, 01, or 10 (signifying a memory access operation), the alpha field 552 (EVEX byte 3, bit [7]—EH) is interpreted as the eviction hint (EH) field 552B and the beta field 754 (EVEX byte 3, bits [6:4]—SSS) is interpreted as a three bit data manipulation field 554C.

When U=1, the alpha field 552 (EVEX byte 3, bit [7]—EH) is interpreted as the write mask control (Z) field 552C. When U=1 and the MOD field 642 contains 11 (signifying a no memory access operation), part of the beta field 554 (EVEX byte 3, bit [4]—$S_0$) is interpreted as the RL field 557A; when it contains a 1 (round 557A.1) the rest of the beta field 554 (EVEX byte 3, bit [6-5]—$S_{2-1}$) is interpreted as the round operation field 559A, while when the RL field 557A contains a 0 (VSIZE 557.A2) the rest of the beta field 554 (EVEX byte 3, bit [6-5]—$S_{2-1}$) is interpreted as the vector length field 559B (EVEX byte 3, bit [6-5]—$L_{1-0}$). When U=1 and the MOD field 642 contains 00, 01, or 10 (signifying a memory access operation), the beta field 554 (EVEX byte 3, bits [6:4]—SSS) is interpreted as the vector length field 559B (EVEX byte 3, bit [6-5]—$L_{1-0}$) and the broadcast field 557B (EVEX byte 3, bit [4]—B).

Exemplary Register Architecture

FIG. 7 is a block diagram of a register architecture 700 according to one embodiment of the invention. In the embodiment illustrated, there are 32 vector registers 710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 600 operates on these overlaid register file as illustrated in the below tables.

| Adjustable Vector Length | Class | Operations | Registers |
|---|---|---|---|
| Instruction Templates that do not include the vector length field 559B | A (FIG. 7A; U = 0) | 510, 515, 525, 530 | zmm registers (the vector length is 64 byte) |
| | B (FIG. 5B; U = 1) | 512 | zmm registers (the vector length is 64 byte) |
| Instruction templates that do include the vector length field 559B | B (FIG. 5B; U = 1) | 517, 527 | zmm, ymm, or xmm registers (the vector length is 64 byte, 32 byte, or 16 byte) depending on the vector length field 559B |

In other words, the vector length field 559B selects between a maximum length and one or more other shorter lengths, where each such shorter length is half the length of the preceding length; and instructions templates without the vector length field 559B operate on the maximum vector length. Further, in one embodiment, the class B instruction templates of the specific vector friendly instruction format 600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 715—in the embodiment illustrated, there are 8 write mask registers (k0 through k7), each 64 bits in size. In an alternate embodiment, the write mask registers 715 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIG. 8A and FIG. 8B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s)

856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 670, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 1008 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
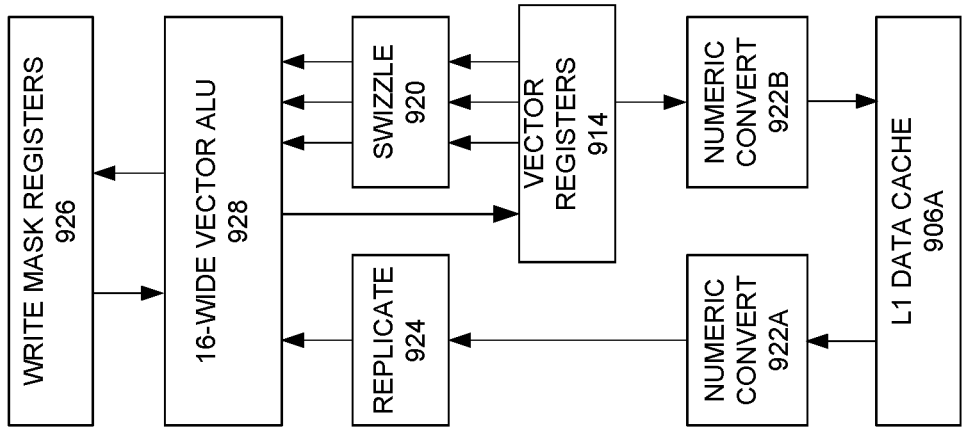
FIG. 9A and FIG. 9B illustrate a block diagram of a more specific exemplary in-order core architecture, which core would be one of several logic blocks (including other cores of the same type and/or different types) in a chip.
Figure 9A:
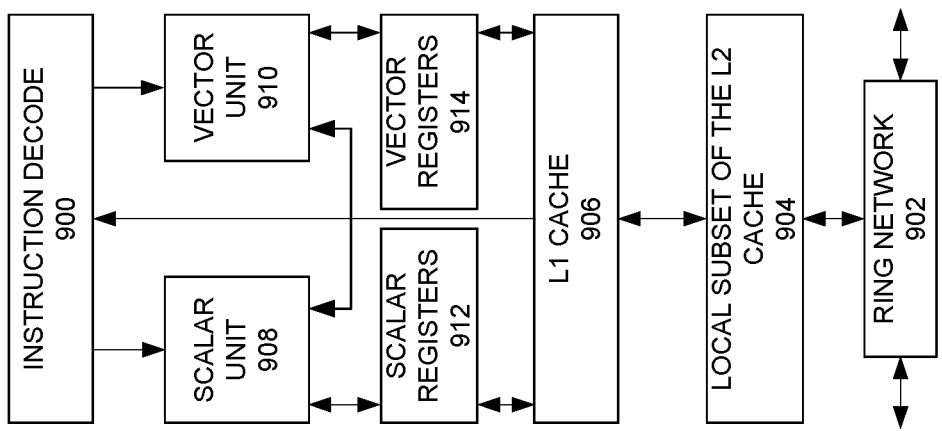

FIGS. 9A and 9B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
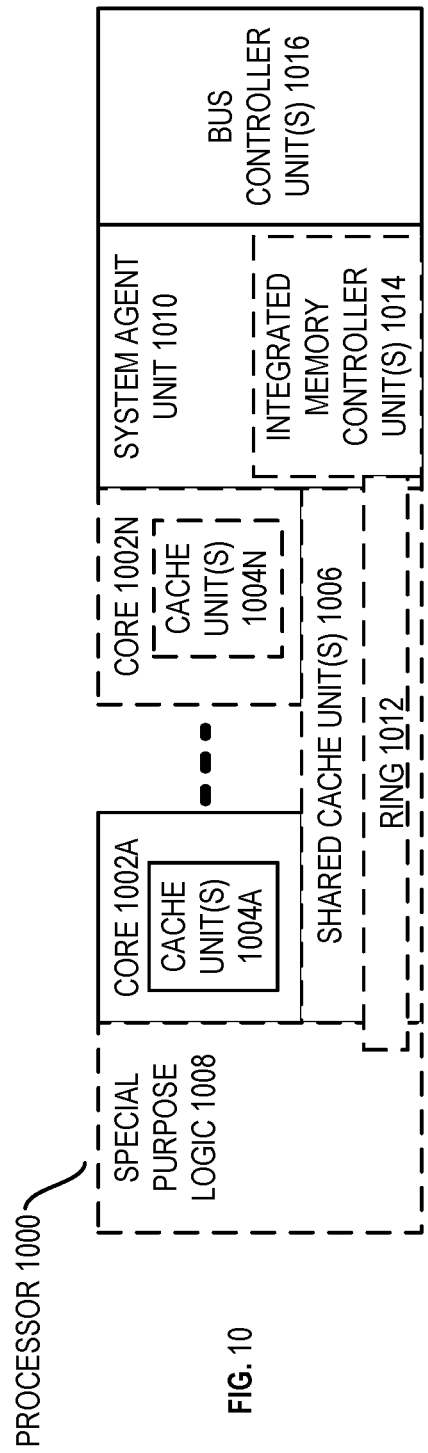
FIG. 10 is a block diagram of a processor that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIG. 11, FIG. 12, FIG. 13, and FIG. 14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
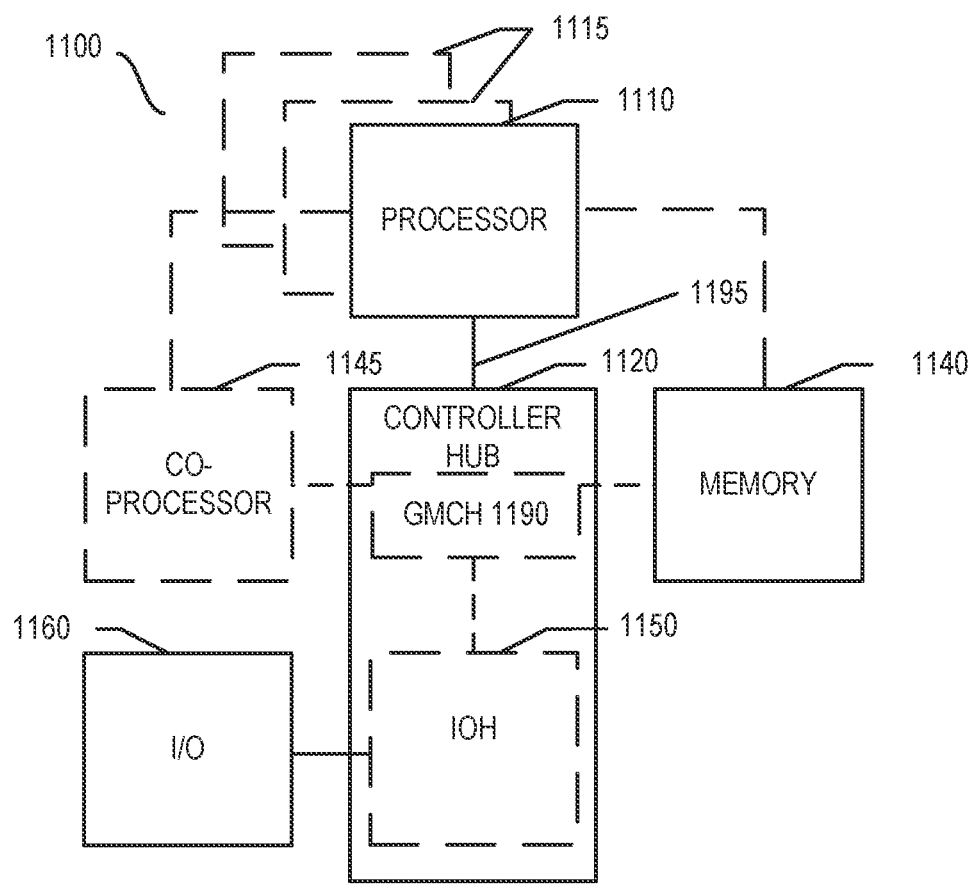
FIG. 11, FIG. 12, FIG. 13, and FIG. 14 are block diagrams of exemplary computer architectures.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
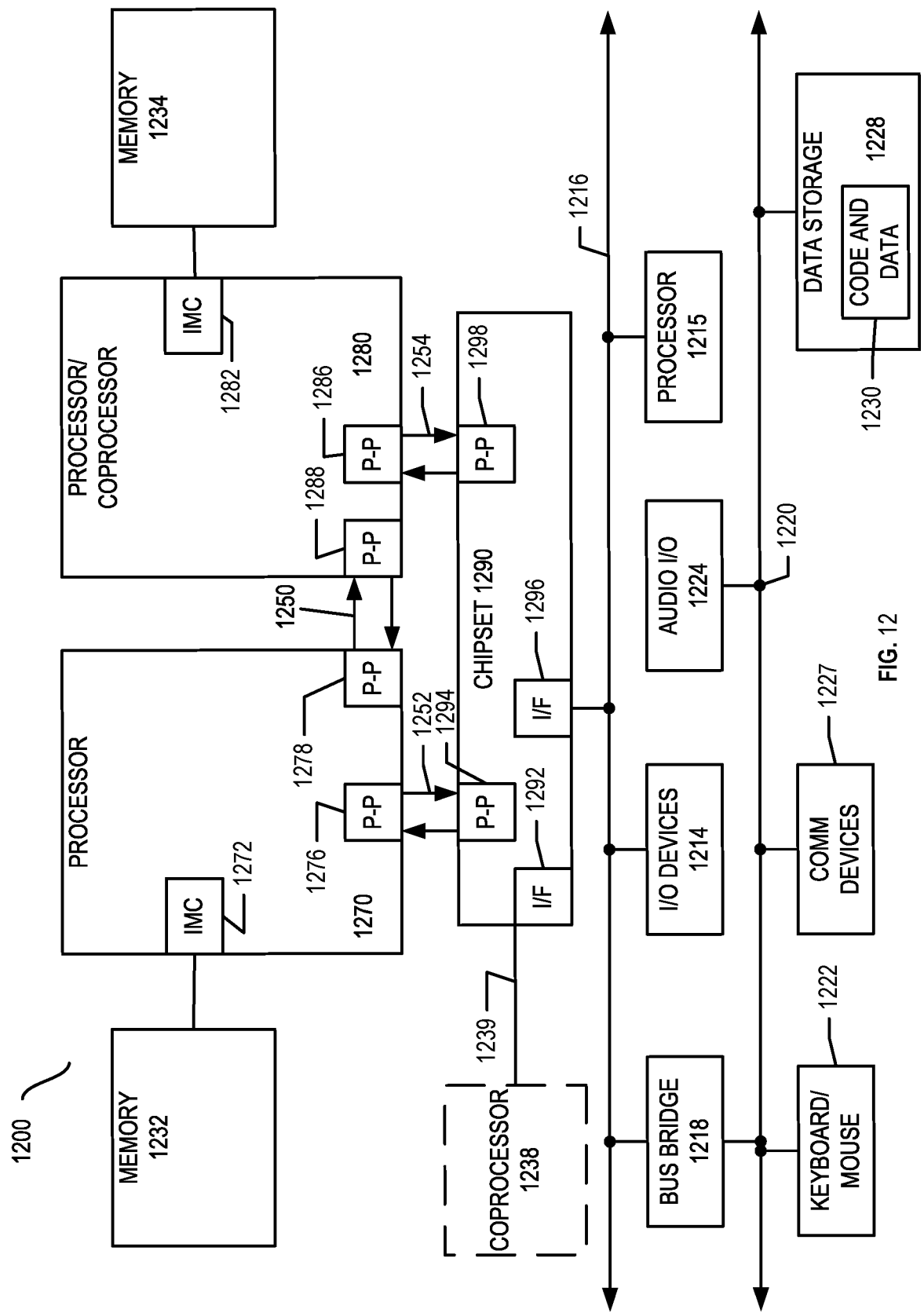

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1200. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
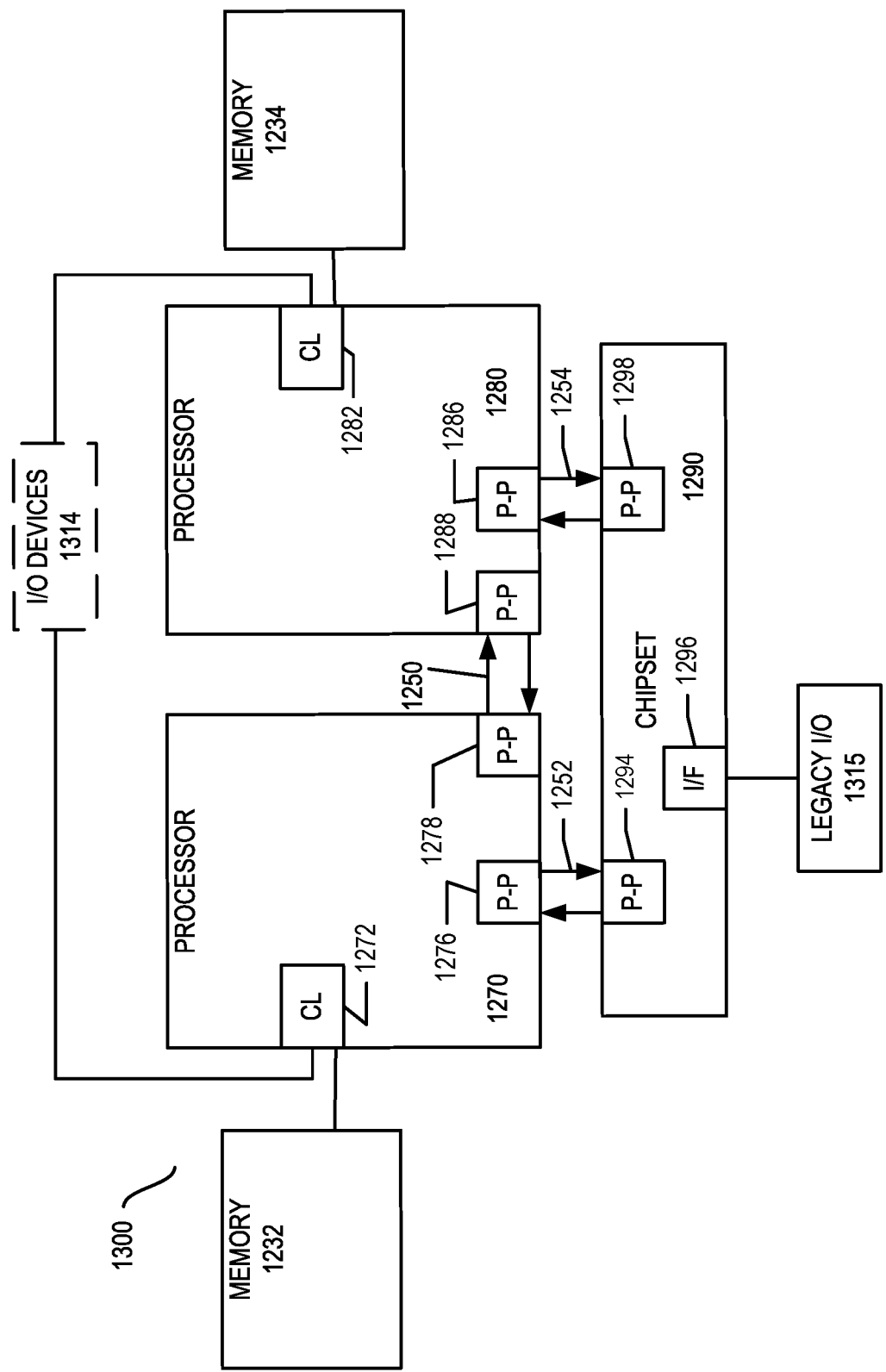

Referring now to FIG. 13, shown is a block diagram of a second more specific exemplary system 1300 in accordance with an embodiment of the present invention. Like elements in FIG. 14 and FIG. 15 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
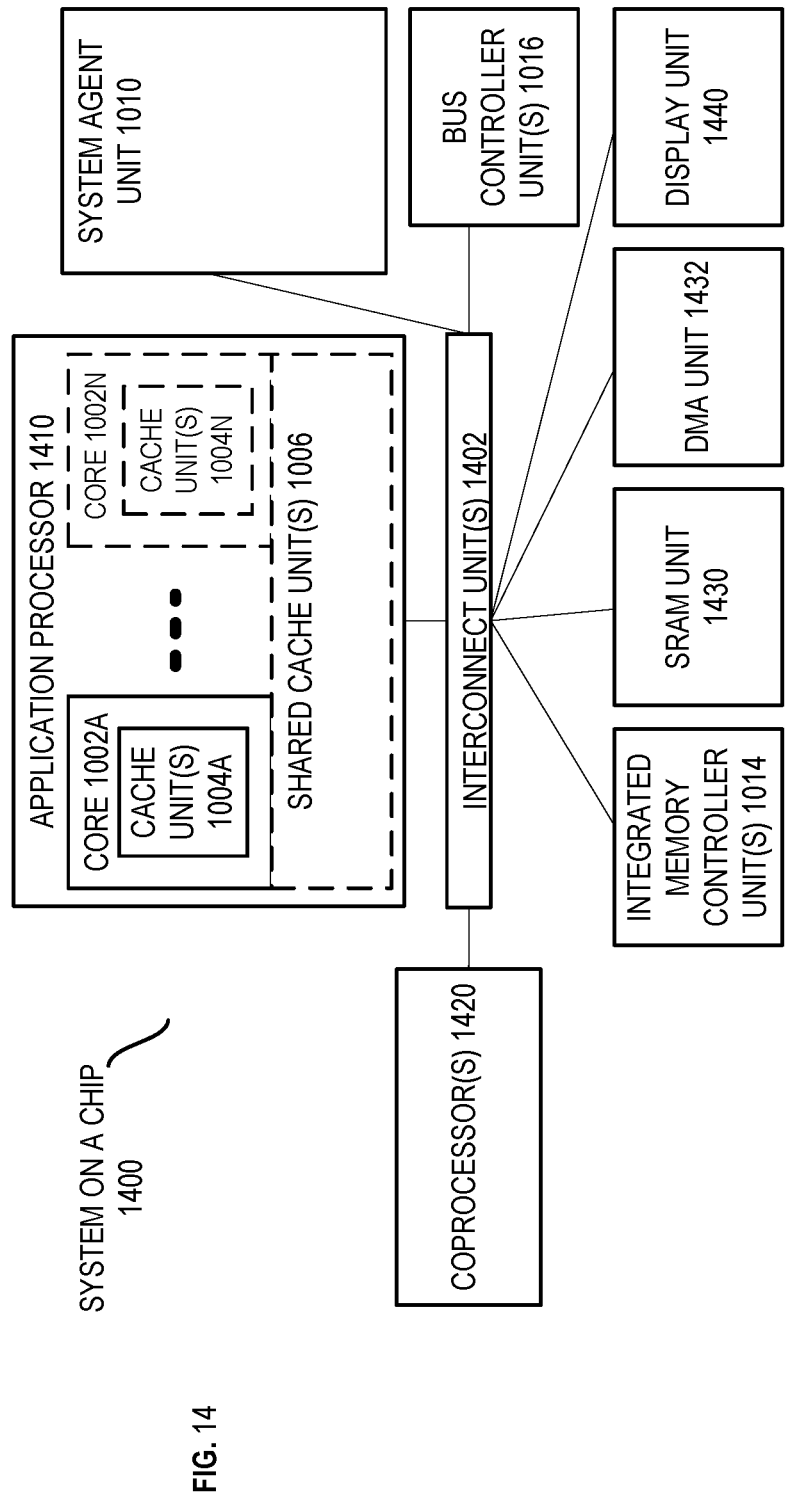

Referring now to FIG. 14, shown is a block diagram of a SoC 1400 in accordance with an embodiment of the present invention. Similar elements in FIG. 10 bear like reference numerals.

Also, dashed lined boxes are optional features on more advanced SoCs. In FIG. 14, an interconnect unit(s) 1402 is coupled to: an application processor 1410 which includes a set of one or more cores 1002A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
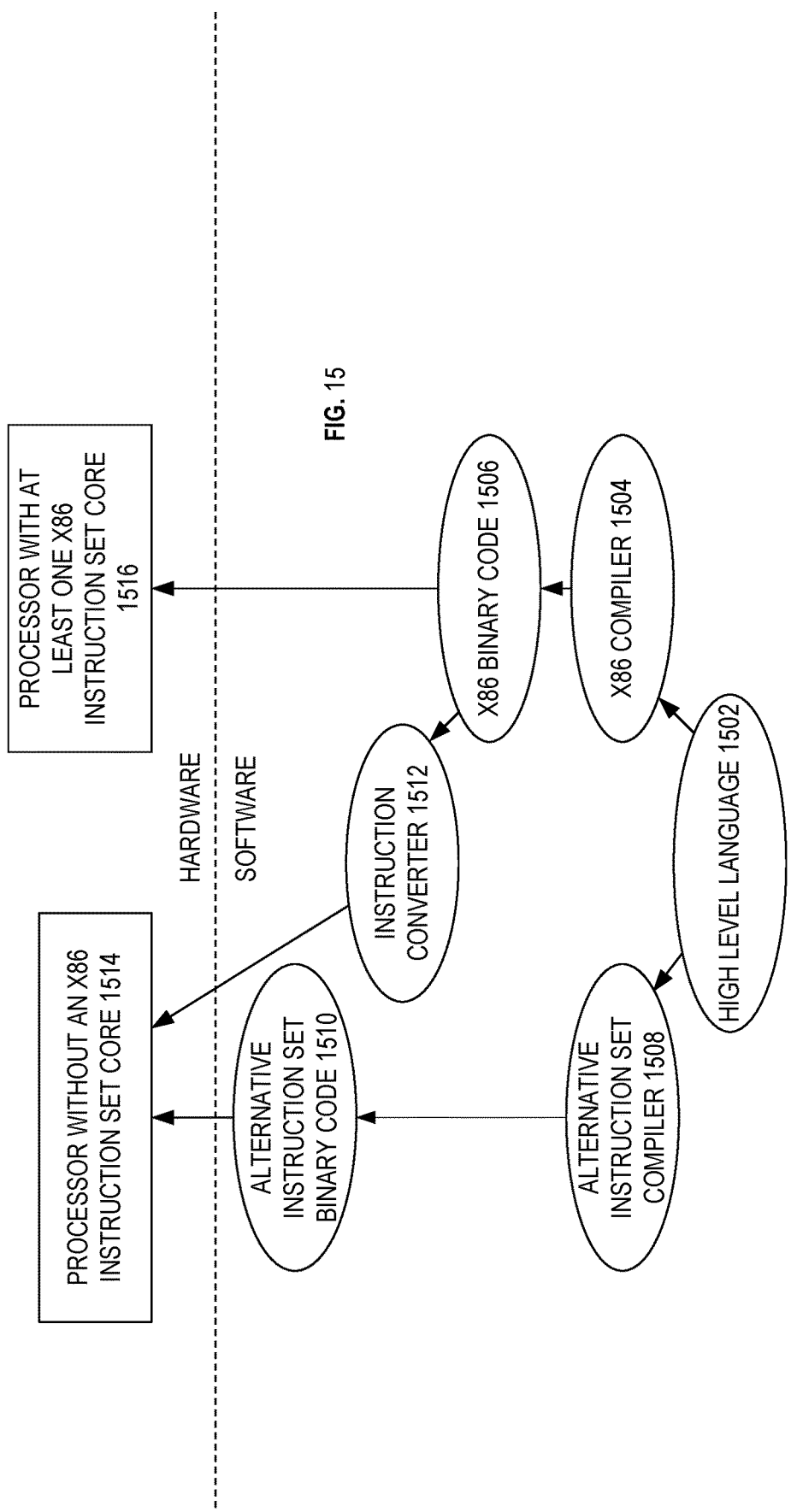
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1706 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

While FIG. 4 illustrates various operations according to one or more embodiments, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to dynamically prioritizing, selecting or ordering a plurality threads for execution by processor circuitry based on a class of service value/indicia assigned to the thread by an operating system executed by the processor circuitry. As threads are executed by processor circuitry, the operating system dynamically updates/associates respective class of service data with each of the plurality of threads. The class of service data is stored in a manufacturer specific register (MSR) associated with the respective thread. Selection circuitry polls the MSRs on a periodic, aperiodic, intermittent, continuous, or event-driven basis and determines an execution sequence based on the current class of service value associated with each of the plurality of threads.

The following examples pertain to further embodiments. The following examples of the present disclosure may comprise subject material such as at least one device, a method, at least one machine-readable medium for dynamically allocating hardware resources among a plurality of threads based on an operating system assigned class of service value associated with each of the plurality of threads.

According to example 1, there is provided a dynamic thread execution selection system. The system may include: processor circuitry to execute an operating system, the processor circuitry including a plurality of processor core circuits, each of the processor core circuits to execute a respective one of a plurality of threads; memory circuitry including a plurality of model specific registers (MSR), each of the plurality of MSRs associated with a respective one of the plurality of threads; and each of the plurality of MSRs to receive MSR data from the operating system; and selection circuitry coupled to the memory circuitry, the selection circuitry to: poll each of the plurality of MSRs to obtain the MSR data stored in the respective MSR; and dynamically select one or more requests by each of at least some of the plurality of threads for execution based at least in part on the MSR data associated with the respective thread and the MSR data associated with each respective one of at least a portion of the remaining plurality of threads.

Example 2 may include elements of example 1 where the MSR data comprises quality of service (QoS) prioritization data.

Example 3 may include elements of any of examples 1 or 2 where the plurality of prioritization levels comprises at least data indicative of one of: a low QoS prioritization level, a medium QoS prioritization level, a high QoS prioritization level, or a multimedia QoS prioritization level.

Example 4 may include elements of any of examples 1 through 3 where the MSR data comprises hardware controlled performance (HWP) data.

Example 5 may include elements of any of examples 1 through 4 where, at intervals, an operating system updates the MSR data associated with each of at least a portion of the plurality of threads.

Example 6 may include elements of any of examples 1 through 5 where the selection circuitry polls the MSR data associated with each respective one of a plurality of threads at regular intervals.

Example 7 may include elements of any of examples 1 through 6 where the selection circuitry reprioritizes an execution sequence of at least a portion of the plurality of threads at the regular intervals.

Example 8 may include elements of any of examples 1 through 7 where the selection circuitry receives MSR data associated with each respective one of a plurality of threads on an event driven basis.

Example 9 may include elements of any of examples 1 through 8 where the event driven basis includes the instantiation of a new thread or the termination one of the plurality of threads.

According to example 10, there is provided a thread execution selection method. The method may include: polling, by selection circuitry, each of a plurality of model specific registers (MSRs) to obtain MSR data, each of the plurality of MSRs associated with a respective one of a plurality of threads executed by processor circuitry; and dynamically selecting, by the selection circuitry, one or more requests by each of at least some of the plurality of threads for execution based at least in part on the MSR data associated with the respective thread and the MSR data associated with each respective one of at least a portion of the remaining plurality of threads.

Example 11 may include elements of example 10, and the method may additionally include: dynamically updating, by an operating system executed by the processor circuitry, the MSR data associated with each of the plurality of threads on a periodic basis.

Example 12 may include elements of any of examples 10 or 11 where polling each of the plurality of MSRs to obtain the MSR data may include: polling, by the selection circuitry, each of the plurality of MSRs on the periodic basis to obtain the MSR data.

Example 13 may include elements of any of examples 10 through 12, and the method may additionally include: dynamically updating, by an operating system executed by the processor circuitry, the MSR data associated with each of the plurality of threads on an event driven basis.

Example 14 may include elements of any of examples 10 through 13 where dynamically updating the MSR data associated with each of the plurality of threads on an event driven basis may include: dynamically updating, by the operating system executed by the processor circuitry, the MSR data associated with each of the plurality of threads on an event driven basis that includes at least one of: the instantiation of a new thread or the termination one of the plurality of threads.

Example 15 may include elements of any of examples 10 through 14 where polling each of the plurality of MSRs to obtain the MSR data may include: polling, by the selection circuitry, each of the plurality of MSRs to obtain MSR data that includes quality of service (QoS) prioritization data associated with each respective one of the plurality of threads.

Example 16 may include elements of any of examples 10 through 15 where polling each of the plurality of MSRs to obtain MSR data that includes quality of service (QoS) prioritization data associated with each respective one of the plurality of threads may include: polling, by the selection circuitry, each of the plurality of MSRs to obtain the MSR data that includes QoS prioritization data associated with each respective one of the plurality of threads; where the plurality of QoS prioritization levels includes data indicative of one of: a low QoS prioritization level, a medium QoS prioritization level, a high QoS prioritization level, or a multimedia QoS prioritization level.

Example 17 may include elements of any of examples 10 through 16 where polling each of the plurality of MSRs to obtain the MSR data may include: polling, by the selection circuitry, each of the MSRs to obtain MSR data that includes hardware controlled performance (HWP) data associated with each respective one of the plurality of threads.

According to example 18, there is provided a non-transitory, machine-readable, storage device. The non-transitory storage device includes instructions that, when executed, cause selection circuitry to: poll each of a plurality of model specific registers (MSRs) to obtain MSR data, each of the plurality of MSRs associated with respective ones of a plurality of threads executed by processor circuitry; and dynamically select one or more requests by each of at least some of the plurality of threads for execution by the processor circuitry based at least in part on the MSR data associated with the respective thread and the MSR data associated with each respective one of at least a portion of the remaining plurality of threads.

Example 19 may include elements of example 18 where the instructions that cause the selection circuitry to poll each of the plurality of MSRs to obtain MSR data further cause the selection circuitry to: poll each of the plurality of MSRs to obtain MSR data to obtain the MSR data associated with respective ones of the plurality of threads on a periodic basis.

Example 20 may include elements of any of examples 18 or 19 where the instructions that cause the selection circuitry to poll each of the plurality of MSRs to obtain MSR data further cause the selection circuitry to: poll each of the plurality of MSRs to obtain the MSR data to obtain the MSR data associated with respective ones of the plurality of threads on an event driven basis.

Example 21 may include elements of any of examples 18 through 20 where the instructions that cause the selection circuitry to poll each of the plurality of MSRs to obtain the MSR data to obtain the MSR data associated with respective ones of the plurality of threads on an event driven basis further cause the selection circuitry to: poll each of the plurality of MSRs to obtain the MSR data to obtain the MSR data associated with respective ones of the plurality of threads on an event driven basis that includes at least one of: the instantiation of a new thread or the termination one of the plurality of threads.

Example 22 may include elements of any of examples 18 through 21 where the instructions that cause the selection circuitry to poll each of the plurality of MSRs to obtain MSR data further cause the selection circuitry to: poll each of the plurality of MSRs to obtain MSR data that includes quality of service (QoS) prioritization data associated with respective ones of the plurality of threads.

Example 23 may include elements of any of examples 18 through 22 where the instructions that cause the selection circuitry to poll each of the plurality of MSRs to obtain the MSR data that includes the QoS prioritization data associated with respective ones of the plurality of threads further causes the selection circuitry to: poll each of the plurality of MSRs to obtain the MSR data that includes the QoS prioritization data associated with respective ones of the plurality of threads; where the plurality of QoS prioritization levels includes data indicative of one of: a low QoS prioritization level, a medium QoS prioritization level, a high QoS prioritization level, or a multimedia QoS prioritization level.

Example 24 may include elements of any of examples 18 through 23 where the instructions that cause the selection circuitry to poll each of the plurality of MSRs to obtain MSR data further cause the selection circuitry to: poll each of the plurality of MSRs to obtain MSR data that includes hardware controlled performance (HWP) data associated with respective ones of the plurality of threads.

According to example 25, there is provided a thread execution selection system. The system may include: means for polling each of a plurality of model specific registers (MSRs) to obtain MSR data, each of the plurality of MSRs associated with a respective one of a plurality of threads executed by processor circuitry; and means for dynamically selecting one or more requests by each of at least some of the plurality of threads for execution based at least in part on the MSR data associated with the respective thread and the MSR data associated with each respective one of at least a portion of the remaining plurality of threads.

Example 26 may include elements of example 25, and the system may additionally include: means for dynamically updating the MSR data associated with each of the plurality of threads on a periodic basis.

Example 27 may include elements of any of examples 25 or 26 where the means for polling each of the plurality of MSRs to obtain the MSR data may include: means for polling each of the plurality of MSRs on the periodic basis to obtain the MSR data.

Example 28 may include elements of any of examples 25 through 27, and the system may additionally include: means for dynamically updating the MSR data associated with each of the plurality of threads on an event driven basis.

Example 29 may include elements of any of examples 25 through 28 where the means for dynamically updating the MSR data associated with each of the plurality of threads on an event driven basis may include: means for dynamically updating the MSR data associated with each of the plurality of threads on an event driven basis that includes at least one of: the instantiation of a new thread or the termination one of the plurality of threads.

Example 30 may include elements of any of examples 25 through 29 where the means for polling each of the plurality of MSRs to obtain the MSR data may include: means for polling each of the plurality of MSRs to obtain MSR data that includes quality of service (QoS) prioritization data associated with each respective one of the plurality of threads.

Example 31 may include elements of any of examples 25 through 30 where the means for polling each of the plurality of MSRs to obtain MSR data that includes quality of service (QoS) prioritization data associated with each respective one of the plurality of threads may include: means for polling each of the plurality of MSRs to obtain the MSR data that includes QoS prioritization data associated with each respective one of the plurality of threads; where the plurality of QoS prioritization levels includes data indicative of one of: a low QoS prioritization level, a medium QoS prioritization level, a high QoS prioritization level, or a multimedia QoS prioritization level.

Example 32 may include elements of any of examples 25 through 31 where the means for polling each of the plurality of MSRs to obtain the MSR data may include: means for polling each of the MSRs to obtain MSR data that includes hardware controlled performance (HWP) data associated with each respective one of the plurality of threads.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A system, comprising:
   processor circuitry to execute an operating system, the processor circuitry including a plurality of processor core circuits, each of the processor core circuits to execute a respective one of a plurality of threads;
   memory including a plurality of model specific registers (MSRs), each of the plurality of MSRs associated with a respective one of the plurality of threads and to receive MSR data comprising quality of service (QoS) prioritization data from the operating system;
   a selection circuitry coupled to the memory, the selection circuitry to:
      poll at least one of the plurality of MSRs to obtain the MSR data stored in the associated MSR on an event-driven basis, the event-driven basis comprising a notification of an instantiation of a new thread of the plurality of threads; and
      dynamically arrange a thread execution sequence to select one or more requests by at least some of the plurality of threads for execution by the processor circuitry based at least in part on the MSR data associated with the at least some of the plurality of threads and the MSR data associated with each respective one of at least a portion of remaining ones of the plurality of threads and send the thread execution sequence to a scheduling circuitry; and
   the scheduling circuitry coupled to the selection circuitry, the scheduling circuitry to receive the thread execution sequence and dynamically schedule execution of the at least some of the plurality of threads by the processor circuitry.

2. The system of claim 1 wherein the QoS prioritization data comprises at least data indicative of one of: a low QoS prioritization level, a medium QoS prioritization level, a high QoS prioritization level, or a multimedia QoS prioritization level.

3. The system of claim 1 wherein the MSR data comprises hardware controlled performance (HWP) data.

4. The system of claim 1 wherein, at intervals, the operating system is to update the MSR data associated with at least a portion of the plurality of threads.

5. The system of claim 1 wherein the selection circuitry is to poll the MSR data at regular intervals.

6. The system of claim 5 wherein the selection circuitry is to reprioritize the thread execution sequence at the regular intervals.

7. The system of claim 1 wherein the event-driven basis includes termination of one of the plurality of threads.

8. A method, comprising:
   polling, by selection circuitry, at least some of a plurality of model specific registers (MSRs) to obtain MSR data comprising thread execution prioritization data on an event-driven basis, each of the plurality of MSRs associated with a respective one of a plurality of threads executed by processor circuitry and the event-driven basis comprising a notification of an instantiation of a new thread of the plurality of threads;
   dynamically arranging a thread execution sequence, by the selection circuitry, to select one or more requests by at least some of the plurality of threads for execution based at least in part on the MSR data associated with the at least some of the plurality of threads and the MSR data associated with at least a portion of remaining ones of the plurality of threads and send the thread execution sequence to a scheduling circuitry; and
   receiving, by the scheduling circuitry, the thread execution sequence and dynamically scheduling execution of the at least some of the plurality of threads by the processor circuitry.

9. The method of claim 8, further comprising:
   dynamically updating, by an operating system executed by the processor circuitry, the MSR data on a periodic basis.

10. The method of claim 9 further comprising:
    polling, by the selection circuitry, the at least some of the plurality of MSRs on the periodic basis to obtain the MSR data.

11. The method of claim 8, further comprising:
    dynamically updating, by an operating system executed by the processor circuitry, the MSR data associated with the at least some of the plurality of threads on the event-driven basis.

12. The method of claim 11 further comprising dynamically updating the MSR data on the event-driven basis that includes termination of one of the plurality of threads.

13. The method of claim 8 wherein polling the at least some of the plurality of MSRs to obtain the MSR data comprises:
    polling, by the selection circuitry, the at least some of the plurality of MSRs to obtain the MSR data that includes quality of service (QoS) prioritization data associated with each respective one of the plurality of threads.

14. The method of claim 13 wherein polling the at least some of the plurality of MSRs to obtain the MSR data comprising the QoS prioritization data including data indicative of one of: a low QoS prioritization level, a medium QoS prioritization level, a high QoS prioritization level, or a multimedia QoS prioritization level.

15. The method of claim 8 wherein polling the at least some of the plurality of MSRs to obtain the MSR data comprises obtaining:
    hardware controlled performance (HWP) data associated with each respective one of the plurality of threads.

16. A system, comprising:
    means for polling at least some of a plurality of model specific registers (MSRs) to obtain MSR data comprising thread execution prioritization data on an event-driven basis, each of the plurality of MSRs associated with a respective one of a plurality of threads executed by processor circuitry and the event-driven basis comprising a notification of an instantiation of a new thread of the plurality of threads from the processor circuitry;
    means for dynamically arranging a thread execution sequence to select one or more requests by at least some of the plurality of threads for execution based at least in part on the MSR data associated with the respective one of the plurality of threads and the MSR data associated with at least a portion of remaining ones of the plurality of threads and sending the thread execution sequence to a means for scheduling; and
    the means for scheduling coupled to the means for dynamically arranging, the means for scheduling to receive the thread execution sequence and dynamically schedule execution of the at least some of the plurality of threads by the processor circuitry.

17. The system of claim 16, further comprising:
    means for dynamically updating the MSR data associated with each of the plurality of threads on a periodic basis.

18. The system of claim 17 wherein the means for polling is for polling the at least some of the plurality of MSRs on the periodic basis to obtain the MSR data.

19. The system of claim 16, further comprising:
means for dynamically updating the MSR data associated with each of the plurality of threads on an event driven basis.

20. The system of claim 19 wherein the means for dynamically updating the MSR data associated with each of the plurality of threads on an event driven basis comprises:
means for dynamically updating the MSR data associated with each of the plurality of threads on an event driven basis that includes at least one of: the instantiation of the new thread or termination one of the plurality of threads.

21. The system of claim 16 wherein the means for polling is for obtaining the MSR data that includes quality of service (QoS) prioritization data associated with each respective one of the plurality of threads.

22. The system of claim 21 wherein the means for polling is for obtaining the QoS prioritization data including data indicative of one of: a low QoS prioritization level, a medium QoS prioritization level, a high QoS prioritization level, or a multimedia QoS prioritization level.

23. The system of claim 16 wherein the means for polling is for obtaining hardware controlled performance (HWP) data associated with each respective one of the plurality of threads.

24. The system of claim 1, wherein based upon a determination that the MSR data associated with at least two of the plurality of threads comprises identical QoS prioritization data, the selection circuitry is to dynamically arrange the thread execution sequence of the at least two of the plurality of threads for execution by the processor circuitry based on an age of each of the at least two of the plurality of threads.

* * * * *